United States Patent
Truong et al.

(10) Patent No.: US 9,554,167 B2
(45) Date of Patent: Jan. 24, 2017

(54) NETWORK MEDIA PROGRAM RESTART

(71) Applicant: Telefonaktiebolaget L M Ericsson (publ), Stockholm (SE)

(72) Inventors: Jeffery Truong, San Francisco, CA (US); Patrick Egloff, Mountain View, CA (US); Mark Tozer, Lake Mary, FL (US); Keith Okabe, San Mateo, CA (US); Hugh Hitchens, San Anselmo, CA (US); Rabih Filfili, Milpitas, CA (US); Aparna Varanasi, San Jose, CA (US); Swapnesh Chaubal, Sunnyvale, CA (US)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 24 days.

(21) Appl. No.: 14/318,510

(22) Filed: Jun. 27, 2014

(65) Prior Publication Data

US 2015/0382031 A1 Dec. 31, 2015

(51) Int. Cl.
*H04N 21/239* (2011.01)
*H04N 21/262* (2011.01)
(Continued)

(52) U.S. Cl.
CPC ...... *H04N 21/2396* (2013.01); *H04N 21/2387* (2013.01); *H04N 21/26208* (2013.01);
(Continued)

(58) Field of Classification Search
IPC ..................... H04N 21/2387,21/26208, 21/437, 21/47217, 21/4821, 21/64753, 21/654,
(Continued)

(56) References Cited

U.S. PATENT DOCUMENTS 5,751,282 A 5/1998 Girard et al.
7,089,579 B1 8/2006 Mao et al.
(Continued)

FOREIGN PATENT DOCUMENTS

TW 200423607 A 11/2004
TW 200850001 A 12/2008
(Continued)

OTHER PUBLICATIONS

"Start Over and Look Back" http://www.timewarnercable.com/en/tv/features/look-back-and-start-over.html, Accessed on May 2, 2014, 3 pages.
(Continued)

*Primary Examiner* — Mulugeta Mengesha
(74) *Attorney, Agent, or Firm* — Nicholson De Vos Webster & Elliott LLP

(57) ABSTRACT

A server for network media program restart receives a request from a client device to restart a media program that is configured as being enabled for network media program restart subject to a set of one or more restrictions. Responsive to determining that a currently airing restriction is configured that allows the media program to be played by the client device only when that media program is currently airing in a locale of the client device and will become unavailable for viewing after a predefined amount of time has elapsed after the currently airing media program ends, the server transmits the media program to the client device for playback only responsive to a determination that at the time of the request the media program is currently airing in the locale of the client device and only when the predefined amount of time has not elapsed.

24 Claims, 20 Drawing Sheets

(51) Int. Cl.
*H04N 21/437* (2011.01)
*H04N 21/472* (2011.01)
*H04N 21/482* (2011.01)
*H04N 21/647* (2011.01)
*H04N 21/654* (2011.01)
*H04N 21/2387* (2011.01)
*H04N 21/6587* (2011.01)

(52) U.S. Cl.
CPC ..... *H04N 21/437* (2013.01); *H04N 21/47217* (2013.01); *H04N 21/4821* (2013.01); *H04N 21/64753* (2013.01); *H04N 21/654* (2013.01); *H04N 21/6587* (2013.01)

(58) Field of Classification Search
IPC .......................................................... 21/6587
See application file for complete search history.

(56) References Cited

U.S. PATENT DOCUMENTS

| | | | | |
|---|---|---|---|---|
| 7,174,126 | B2 * | 2/2007 | McElhatten | G06F 3/0482 348/E5.104 |
| 8,312,493 | B2 | 11/2012 | Azam et al. | |
| 8,707,376 | B1 * | 4/2014 | Hannum | 386/324 |
| 2003/0208767 | A1 * | 11/2003 | Williamson | G06F 3/0482 725/93 |
| 2005/0160465 | A1 | 7/2005 | Walker | |
| 2006/0013557 | A1 * | 1/2006 | Poslinski | H04N 5/783 386/250 |
| 2006/0230123 | A1 * | 10/2006 | Simmons | G06Q 30/0603 709/219 |
| 2008/0253406 | A1 | 10/2008 | Hasek | |
| 2009/0112969 | A1 | 4/2009 | Ganesh et al. | |
| 2009/0320084 | A1 | 12/2009 | Azam et al. | |
| 2010/0242079 | A1 * | 9/2010 | Riedl | H04N 7/17318 725/115 |
| 2012/0030721 | A1 | 2/2012 | Smith et al. | |
| 2012/0144436 | A1 | 6/2012 | Berberet et al. | |

FOREIGN PATENT DOCUMENTS

| | | |
|---|---|---|
| TW | 201215049 A | 4/2012 |
| TW | 201233177 A | 8/2012 |

OTHER PUBLICATIONS

"Microsoft Mediaroom 2.0 Features—Restart Anytime Over" http://links.dynamicscrmteam.com/2011/07/12/microsoft-mediaroom-2-0-features-%E2%80%93-restart-anytime-overview/, Posted on Jul. 12, 2011, Accessed on Jun. 27, 2014, 2 pages.

* cited by examiner

ENHANCED NETWORK RESTART CONFIGURATION 125

| MEDIA PROGRAM 620 | FF TRICK MODE 622 | FF TRICK SPEED 624 | RW TRICK MODE 626 | RW TRICK SPEED 628 | CURRENTLY AIRING 630 | RECORDING 632 | PAUSE 634 | NO. OF RESTARTS 636 | BLACKOUT 638 | TIME PERIOD 640 |
|---|---|---|---|---|---|---|---|---|---|---|
| Program 9 | Yes | 2X | Yes | 2X | Yes | No Recording | Pausing Allowed | Any | No | Any |
| Program 11 | No | None | Yes | 3X | Yes | No Recording | No | 2 | Yes | Any |
| Program 13 | No | None | No | No | No | No Recording | No | 1 | No | 09:00-16:00 |

FIG. 6

NETWORK MEDIA PROGRAM RESTART

FIELD

Embodiments of the invention relate to the field of media systems; and more specifically, to network media program restart.

BACKGROUND

Television (TV) viewing has traditionally been one-dimensional; either live TV viewing or viewing at the present. With the introduction of the Digital Video Recorder (DVR), users are able to pause Live TV or schedule recordings for later viewing. DVR technology has limitations including that each household needs to have a physical hard disk on the set-top box to pause/fast-forward/rewind Live TV or schedule recordings, the user needs to remember to schedule the recording if the user wants to view it later, parallel recordings are limited to the hardware or software of the device, and the number of shows that can be stored is limited by the storage on the device.

Trick modes (e.g., fast-forward, rewind, and pause) are a common feature of digital video systems that simulate the visual feedback of traditional fast-forward, rewind, and pause operations performed in analog video systems. Trick modes may be implemented by either including in the video stream only a subset of frames or having a separate stream for each different speed supported (e.g., a stream that supports normal speed playback, another stream that supports 2× normal speed playback for fast-forwarding, etc.).

Restart TV is a service to allow the user to timeshift within channels to restart in-progress programs that the user has just tuned to and are not in a local buffer of the user's client device. Thus, restart TV allows users to view previously aired programming without requiring local storage of that video. Restart TV is distinct from video on demand (VoD) service. The programs available for viewing in restart TV are those that aired in a relatively short amount of time in the past (e.g., the last 72 hours) whereas the programs available for viewing in a VoD service are programs that may have aired many weeks, months, or years ago. In addition, the programs available for viewing in restart TV are typically only available for a relatively short period of time (e.g., 72 hours) whereas programs available for viewing in VoD are typically available for a relatively longer period of time (e.g., weeks, months, or years).

The channels that support restart TV service are typically indicated in a program guide to allow the user to navigate to view past programs. Restart TV eliminates the limitation of parallel recordings, pre-scheduling recordings, and storage constraints. There may be limitations on the Restart TV service such as not allowing trick modes.

SUMMARY

A server for network media program restart receives a first request from a client device to restart a media program from a beginning of the media program where the media program is configured as being enabled for network media program restart subject to a set of one or more restrictions. The server determines the set of restrictions for the media program and responsive to determining that a currently airing restriction is configured as one of the set of restrictions that allows the media program to be played by the client device only when that media program is currently airing in a locale of the client device and where the media program will become unavailable for viewing after a predefined amount of time has elapsed after the currently airing media program ends, the server determines whether at a time of the first request the media program is currently airing in the locale of the client device and transmits the media program to the client device for playback only responsive to a determination that at the time of the first request the media program is currently airing in the locale of the client device and only when the predefined amount of time has not elapsed.

A client device for network media program restart receives a message that indicates that network media program restart is enabled for a set of one or more media programs of a media channel. For each of the set of media programs, the client device causes a first indicator to be displayed that indicates that the media program is allowed to be restarted regardless of whether the media program is included in a local buffer of the client device. Upon the client device receiving input to restart a first one of the set of media programs, the client device transmits a first request to a server for the first media program. The client device receives, from the server, a stream for the first media program where the stream is associated with a set of one or more restrictions including a restriction that playing of the stream will not be allowed after a predefined amount of time has elapsed after the first media program has finished airing in a locale of the client device. The client device plays the stream and causes a second indicator to be displayed during playing of the stream that indicates a remaining amount of time until playing of the stream will no longer be allowed.

BRIEF DESCRIPTION OF THE DRAWINGS

The invention may best be understood by referring to the following description and accompanying drawings that are used to illustrate embodiments of the invention. In the drawings:

FIG. 6 illustrates exemplary restrictions on network media program restart according to one embodiment;

DESCRIPTION OF EMBODIMENTS

Figure 1:
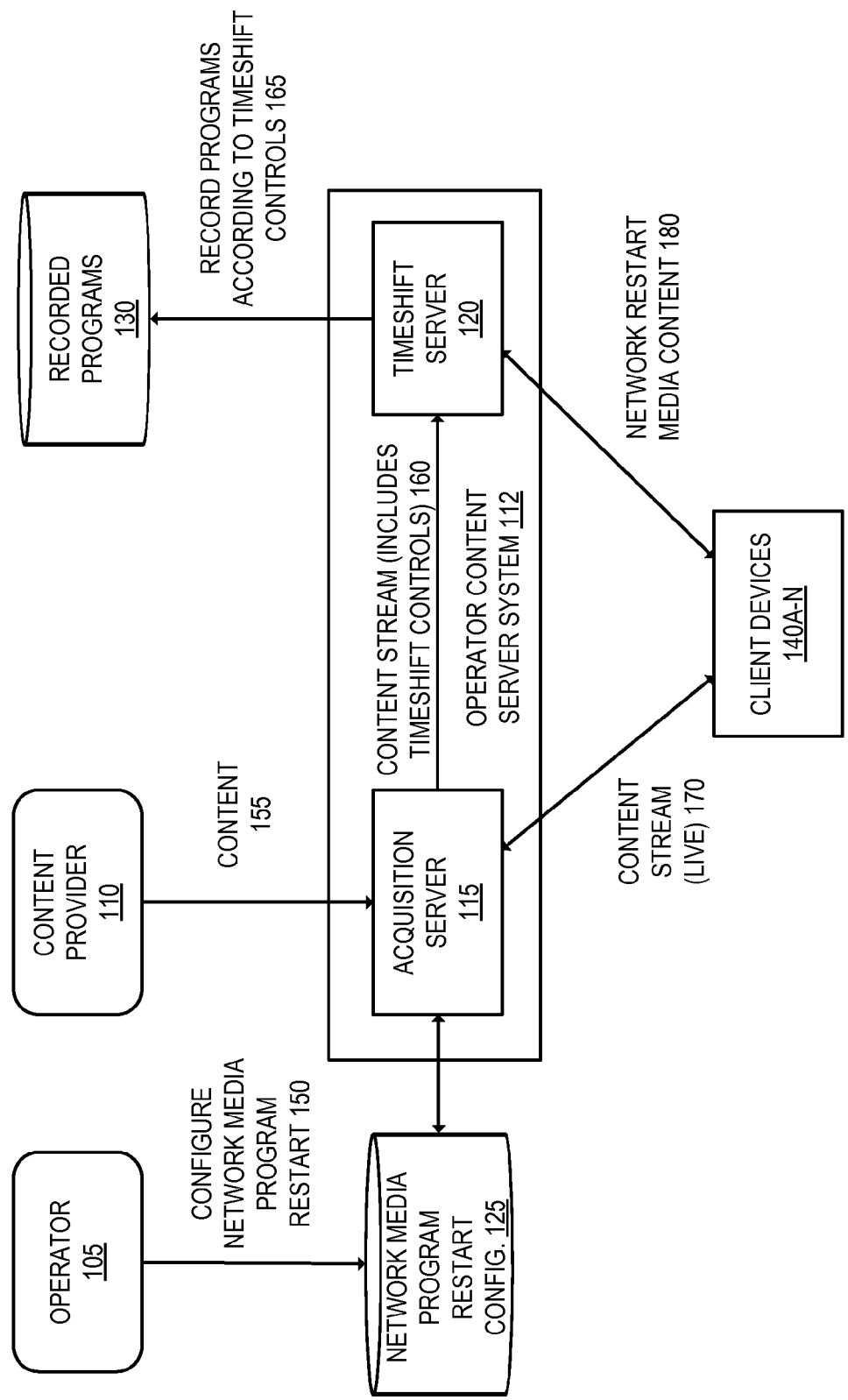
FIG. 1 illustrates an exemplary system for network media program restart according to one embodiment.

In the following description, numerous specific details are set forth. However, it is understood that embodiments of the invention may be practiced without these specific details. In other instances, well-known circuits, structures and techniques have not been shown in detail in order not to obscure the understanding of this description. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

An electronic device stores and transmits (internally and/or with other electronic devices over a network) code (which is composed of software instructions and which is sometimes referred to as computer program code or a computer program) and/or data using machine-readable media (also called computer-readable media), such as machine-readable storage media (e.g., magnetic disks, optical disks, read only memory (ROM), flash memory devices, phase change memory) and machine-readable transmission media (also called a carrier) (e.g., electrical, optical, radio, acoustical or other form of propagated signals—such as carrier waves, infrared signals). Thus, an electronic device (e.g., a computer) includes hardware and software, such as a set of one or more processors coupled to one or more machine-readable storage media to store code for execution on the set of processors and/or to store data. For instance, an electronic device may include non-volatile memory containing the code since the non-volatile memory can persist the code even when the electronic device is turned off, and while the electronic device is turned on that part of the code that is to be executed by the processor(s) of that electronic device is copied from the slower non-volatile memory into volatile memory (e.g., dynamic random access memory (DRAM), static random access memory (SRAM)) of that electronic device. Typical electronic devices also include a set or one or more physical network interface(s) to establish network connections (to transmit and/or receive code and/or data using propagating signals) with other electronic devices. One or more parts of an embodiment of the invention may be implemented using different combinations of software, firmware, and/or hardware.

A method and apparatus for network media program restart service is described herein. In one embodiment, the network media program restart service allows an operator (e.g., a television operator) or content provider to configure specific media programs on their channels with network restart capability on a per-program basis and a set of one or more restrictions on the restart capability including whether a currently airing restriction is enforced that allows the media program to be played by a client device only when that media program is currently airing in a locale of the client device and that media program will become unavailable for viewing after a predefined amount of time has elapsed after the currently airing media program ends. Other restrictions may include one or more of: whether one or more trick modes is enabled (e.g., fast-forward, rewind, and/or pause) and if enabled a speed of the enabled fast-forward or rewind trick mode (e.g., 2×, 3×, etc.); whether one or more trick modes is disabled for certain portion(s) of the media program (e.g., disabling fast-forward trick mode during commercials of the program); a number of restarts that are allowed for that program by the client device; whether and to what extent that program is subject to blackout restrictions; and one or more time periods in which that program is allowed to be restarted and/or one or more time periods in which that program is not allowed to be restarted. The network media program restart service described herein provides flexibility such that the operator can control which programs have restart capability and different restrictions based on contractual agreement by the operator and the content provider, for example.

At least some of the configuration is transferred to the client device. The user interface of the client device provides various hints of what program(s) are capable of being restarted through the network even when the client device is not tuned to that program or has not otherwise recoded the program so that the user has awareness of the ability to restart programs that are not in the client device's local buffer. The user interface may also display or indicate restriction(s) on the network media program restart. For example, when there is playback restriction such as disabling of fast forwarding over commercial, currently airing restriction, etc., the user interface of the client device will display dialogs to the user that specifies the restriction FIG. 1 illustrates an exemplary system for network media program restart according to one embodiment. The operator content server system 112 includes a number of servers to support the media program service including an acquisition server 115 and a timeshift server 120. The acquisition server 115 acquires content 155 from the content provider 110. By way of example, the content 155 may be media content for a television channel (e.g., television shows, movies, etc.) of the content provider 110. It should be understood that the acquisition server 115 may acquire content from multiple content providers.

The operator 105 configures 150 network media program restart for one or more of its media programs, which may be on a per-program basis, that are acquired by the acquisition server 115. In some embodiments the operator 105 and the content provider 110 are different entities (e.g., the operator 105 may be a television operator offers a collection of channels for users to view from multiple content providers whereas the content provider 110 provides content for one or more of its channels to the service of the operator 105); while in other embodiments they may be the same entity. Although FIG. 1 shows the operator 105 configuring the network media program restart, in some embodiments the content provider 110 configures the network media program restart for its content. The network media program restart configuration is stored in the network media program restart configuration data store 125. An exemplary format of the network media program restart configuration is illustrated in FIG. 6. It should be understood that the data structure illustrated in FIG. 6 is exemplary and embodiments are not limited to a specific data structure. As illustrated in FIG. 6, each media program 620 can be configured separately that specifies whether the fast-forward trick mode 622 is enabled, a fast-forward trick mode speed 624, whether the rewind trick mode 626 is enabled, a rewind trick mode speed 628, whether a currently airing restriction 630 is enabled, whether recording of the media program is allowed 632, whether pausing of the media program is allowed 634, a number of restarts that are allowed by a particular client device 636, whether and to what extent that program is subject to blackout restrictions 638; and one or more time periods in which that program is allowed to be restarted and/or one or more time periods in which that program is not allowed to be restarted 640.

The acquisition server 115 transmits at least part of the configuration to the client devices 140A-N. The client devices 140A-N are computing devices capable of playing the media content provided through the media program service. Example client devices include a Set Top Box (STB) that is connected to a display (commonly a television set but can be another type of display such as a computer monitor, projector, etc.), a smart phone, a tablet, a laptop, a desktop, a portable media player, a gaming system, and a wearable computing device (e.g., a smartwatch, digital eyewear), each of which includes one or more processors, computer-readable storage, a display and/or connections to a display, and software to allow connectivity/interaction with the media program service. The user interface of the client device is configured to process the received configuration and provide various hints of what program(s) are capable of being restarted through the network even when the client device is not tuned to that program or has not otherwise recoded the program so that the user has awareness of the ability to restart programs that are not in the client device's local buffer. The user interface may also display or indicate restriction(s) for the network media program restart. For example, when there is playback restriction such as disabling of fast forwarding over commercial, currently airing restriction, etc., the user interface of the client device will display dialogs to the user that specifies the restriction.

The acquisition server 115 may transmit the configuration to the client devices 140A-N differently in different embodiments. In one embodiment, the acquisition server 115 transmits a timeshift map to the client devices 140A-N that specifies the media program(s) that are enabled for network media program restart to allow the client devices to display the indications of which programs are allowed to be restarted. In another embodiment, the acquisition server 115 transmits a timeshift map to the client devices 140A-N that specifies the media program(s) that are enabled for network media program restart and also transmits timeshift controls (which specify the restrictions on playback for those media program(s)) so the client devices can enforce those restrictions locally.

In one embodiment, the acquisition server 115 processes the content 155 (which may be a stream), adds Digital Rights Management (DRM) to the stream, and adds timeshift controls to the content 155 as defined in the data store 125 for the network media program restart configuration. The content stream 160, which includes the timeshift controls, is streamed to the timeshift server 120. For example, the timeshift server 120 listens to the multicast address on which the content stream 160 is being streamed to receive the content stream 160. The timeshift server 120 records 165 the media programs according to the timeshift controls included in the content stream 160. For example, if the timeshift controls indicate that a first media program of the content stream 160 is not allowed to be restarted, the timeshift server 120 will not record that program; and if the timeshift controls indicate that a second media program of the content stream 160 is allowed to be restarted, the timeshift server 120 records that program and stores the recorded program in the recorded programs 130. In one embodiment, the recorded programs 130 are implemented as a circular buffer that holds up to a certain number of hours of content for each channel (e.g., up to 72 hours).

The acquisition server 115 streams the content to the listening client devices 140A-N, which the client devices 140A-N can view in real time (or substantially in real time). For example, a client device 140 can join the stream to receive the content stream 170. The client devices may locally record the content stream if supported into a local client buffer. The client devices 140A-N are also adapted to request and receive from the timeshift server 120 media programs that have been configured as being restartable 180.

Figure 2:
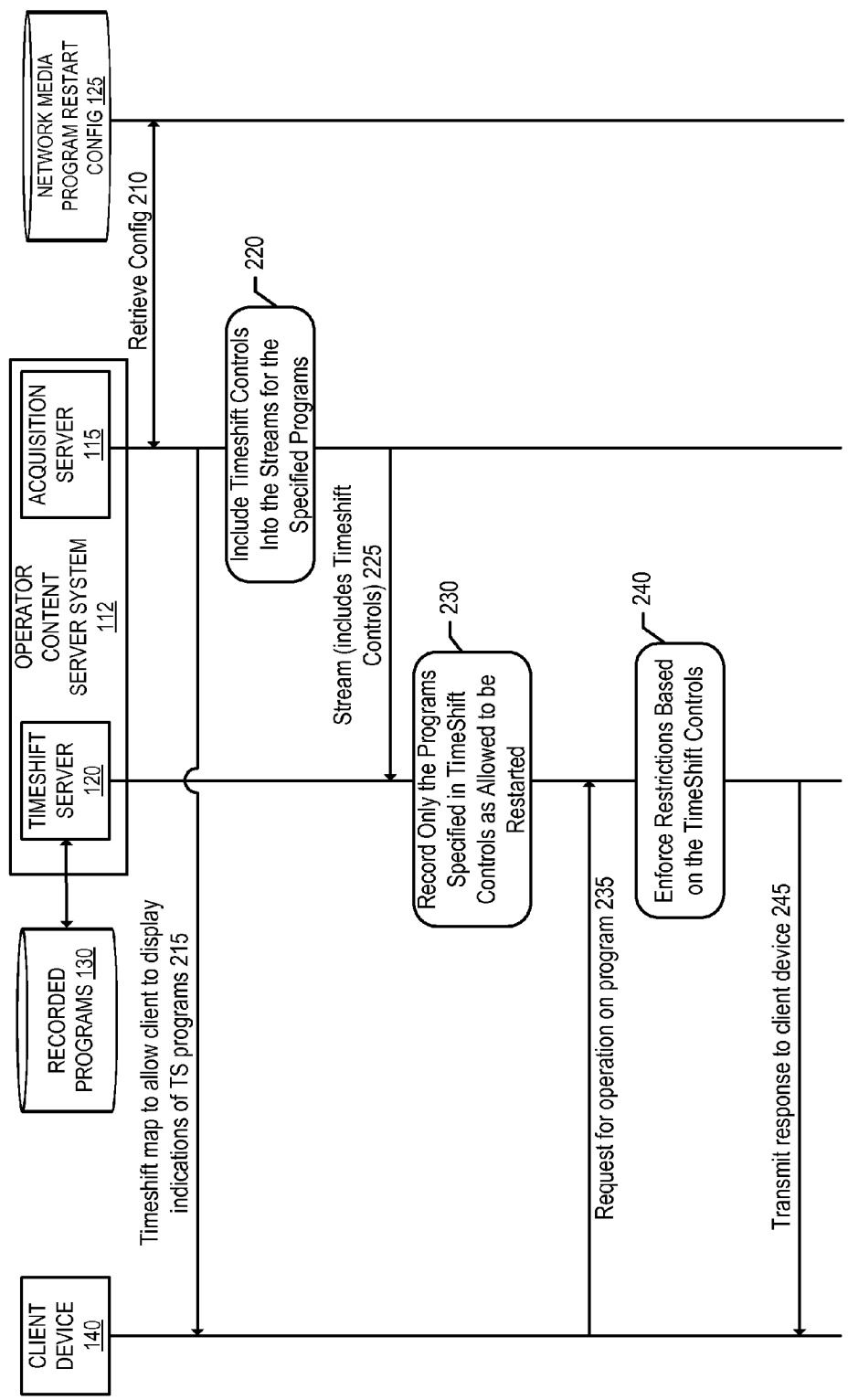
FIG. 2 illustrates an exemplary flow of operations for network media program restart according to one embodiment.

FIG. 2 illustrates an exemplary flow of operations for network media program restart according to one embodiment. The operations described with respect to FIG. 2 will be described with respect to the exemplary embodiments of FIG. 1. However it should be understood that the operations described with respect to FIG. 2 can be performed by embodiments other than those discussed with reference to FIG. 1 and the embodiments discussed with reference to FIG. 1 can perform operations different from those discussed with reference to FIG. 2.

At operation 210, the acquisition server 115 retrieves the configuration for network media program restart from the data store 125. The configuration may have been performed by an operator or a content provider and defines which media program(s) are enabled for network media program restart and restriction(s) for the network media program restart. The restrictions may include one or more of the following: whether a currently airing restriction is enforced that allows the media program to be played by a client device only when that media program is currently airing in a locale of the client device and that media program will become unavailable for viewing after a predefined amount of time has elapsed after the currently airing media program ends; whether one or more trick modes is enabled (e.g., fast-forward, rewind, and/or pause) for the media program and if enabled a speed of the enabled fast-forward or rewind trick mode (e.g., 2×, 3×, etc.); whether one or more trick modes is disabled for certain portion(s) of the media program (e.g., disabling fast-forward trick mode during commercials of the program); a number of restarts that are allowed for that program by the client device; whether and to what extent that media program is subject to blackout restrictions; whether the media program is allowed to be recorded by a client device; and one or more time periods in which that program is allowed to be restarted and/or one or more time periods in which that program is not allowed to be restarted. The configuration may also include a visual indication (e.g., a customized logo) that may be displayed in conjunction with the media program when the media program is being played via network media program restart.

Sometime after retrieving the configuration, at operation 215 the acquisition server 115 transmits a timeshift map to the client device 140 that specifies the media program(s) that are enabled for network media program restart to allow the client device 140 to display indications of which programs are allowed to be restarted. Although not illustrated in FIG. 2, a channel map may also be transmitted to the client device 140 that provides a list of channels that are accessible by the client device 140, which are used by the client device 140 to determine what channels to display to the user (e.g., in a program guide). The timeshift map further allows the client device to display to the user (e.g., in a program guide) which program(s) can be restarted using the network media program restart service.

Also after retrieving the configuration, at operation 220 the acquisition server 115 includes timeshift controls that specify one or more restrictions on the network media program restart (based on the retrieved configuration) into the streams for the specified media programs. The content stream, which includes the timeshift controls, is streamed to the timeshift server 120 at operation 225. The timeshift server 120 records only the programs specified in the timeshift controls as being enabled for network media program restart and subject to any restrictions included in the timeshift controls at operation 230. For example, if the timeshift controls indicate that a first media program of the content stream is not allowed to be restarted, the timeshift server 120 will not record that program; and conversely if the timeshift controls indicate that a second media program of the content stream 160 is allowed to be restarted, the timeshift server 120 records that program and stores the recorded program in the recorded programs 130.

At operation 235, the timeshift server 120 receives from the client device 140 a request for an operation on one of the programs indicated as being restartable. For example, the timeshift server 120 receives a request to play one of the programs indicated as being restartable. The client device 140 may receive the request from a user in a number of ways as will be described in greater detail later herein.

Figure 9:
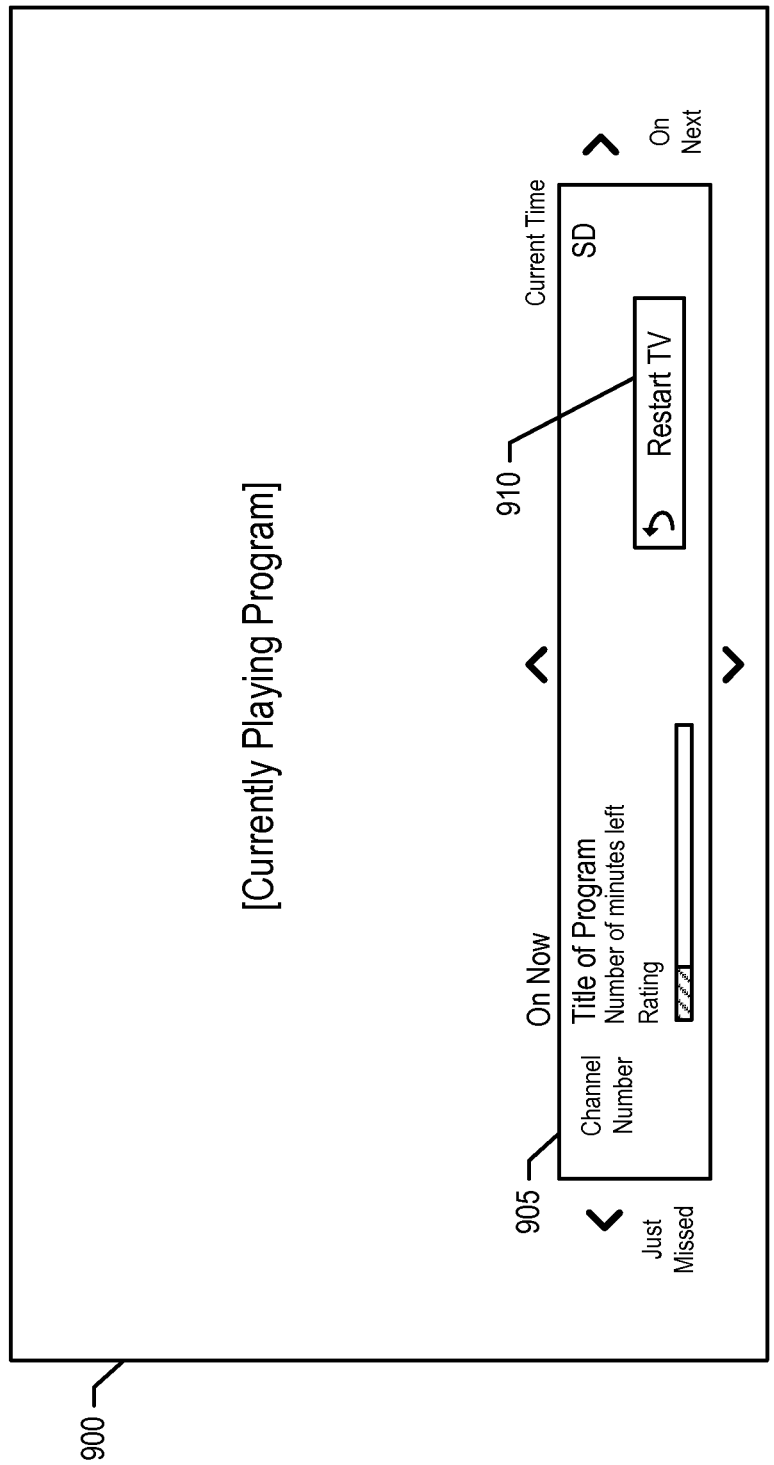
FIG. 9 illustrates an exemplary user interface of a client device that includes a channel bar that includes a visual indicator that an in-progress media program is allowed to be restarted according to one embodiment.

As previously described, the client device 140 is adapted to visually indicate to users which programs can be restarted using the network media program restart. There may be several different ways the visual indication is presented to users. For example, FIG. 9 illustrates an exemplary user interface of the client device 140 that includes a "channel bar" that includes a visual indicator that an in-progress program is allowed to be restarted. The interface 900 is displayed to the user in response to a user tuning to an in-progress medium that has been configured as being restartable using the network media program restart. The channel bar 905 is overlaid on top of the currently playing program and includes a number of attributes about the currently playing program including the channel number, title of program, and number of minutes remaining in the program. The channel bar also includes the indicator 910 which indicates to the user that the media program can be restarted. As illustrated in FIG. 9, the indicator includes a textual component ("Restart TV") and also includes a logo of a rewind arrow. In one embodiment, the indicator 910 is displayed only responsive to the client device determining that the media program is not in a local pause buffer of the client device. Upon receiving a selection from a user of the client device of the indicator 910, in some embodiments a request to restart the program from its beginning is transmitted to the timeshift server 120 and in other embodiments a program information user interface is displayed to the user, which will be described in greater detail with respect to FIG. 13. This input selection, as well as other selections received from the user described herein, may be received in a number of ways (e.g., receiving a selection as a result of a user using a remote to highlight and select the indicator, receiving a voice command from the user to select the indicator, receiving a selection of the indicator through a touchscreen, receiving input from a dedicated button on a remote control, etc.).

Figure 10:
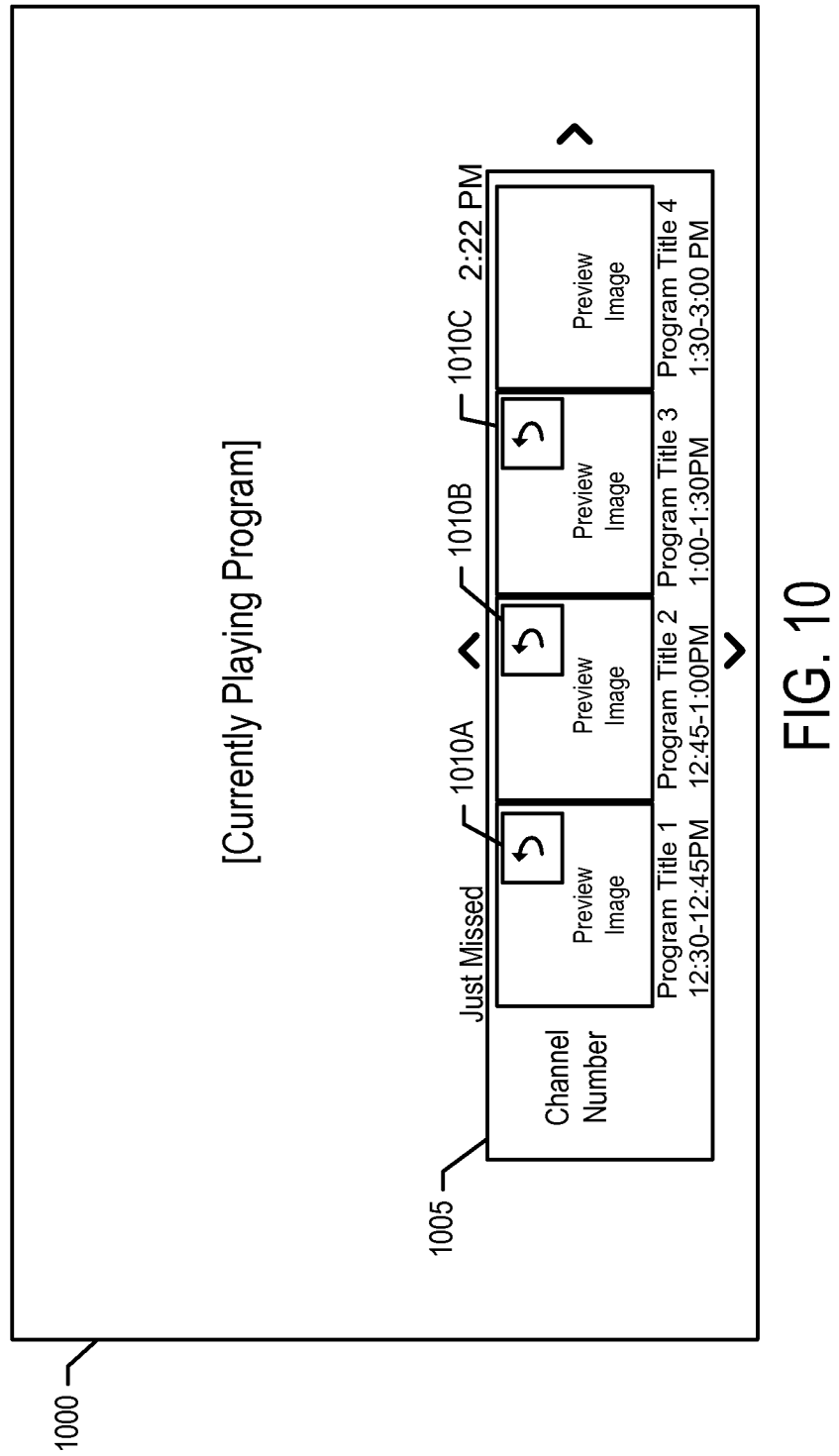
FIG. 10 illustrates an exemplary user interface of a client device that includes a browse bar that includes visual indicators of media programs that are that are allowed to be restarted according to one embodiment.

FIG. 10 illustrates an exemplary user interface 1000 of the client device 140 that includes a "browse bar" 1005 that includes visual indicators of media programs that are that are allowed to be restarted. The interface 1000 is displayed in response to receiving a selection from the user of a "browse" operation. The browse bar 1005 is overlaid on top of the currently playing program and illustrates a number of programs that have aired immediately in the past (referred to in the figure as "Just Missed"). For example, the programs: program title 1, program title 2, and program title 3 have occurred in the past. Each program that is allowed to be restarted includes a visual indication, which may be selectable. For example, the program title 1 includes a restart visual indicator 1010A, the program title 2 includes a restart visual indicator 1010B, and the program title 3 includes a restart visual indicator 1010C. The visual indicators 1010A-C include a logo of a rewind arrow; however it should be understood that the visual indicator is not limited to any particular logo or visualization.

The program title 4 is not allowed to be restarted and therefore does not have a corresponding restart visual indicator. In one embodiment, the indicators 1010A-C are displayed only responsive to the client device determining that the corresponding media program is not in a local pause buffer of the client device. Upon receiving a selection from a user of the client device of one of the indicators 1010A-C, in some embodiments a request to restart the corresponding media program from its beginning is transmitted to the timeshift server 120 and in other embodiments a program information user interface is displayed to the user, which will be described in greater detail with respect to FIG. 13.

Figure 11:
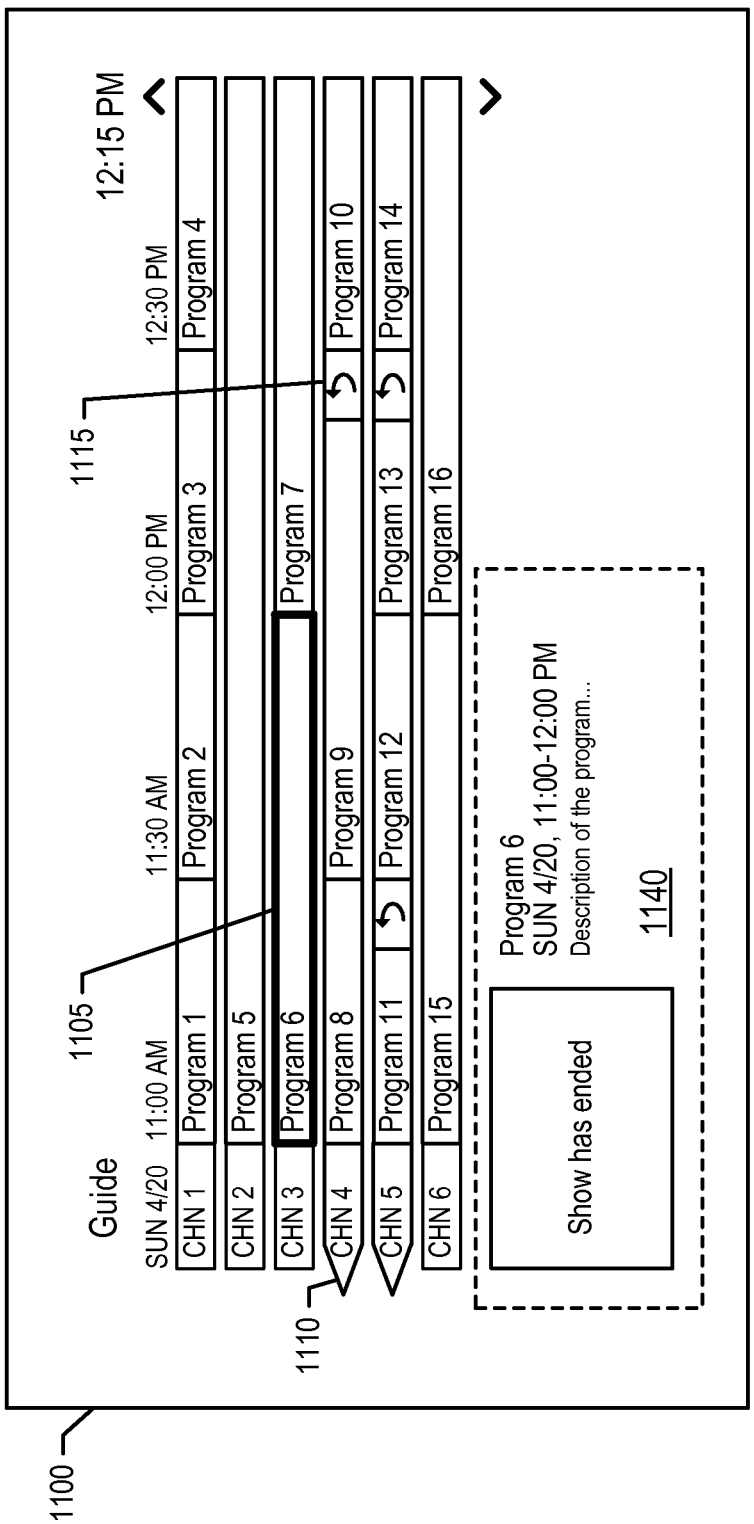
FIG. 11 illustrates an exemplary user interface of a client device that includes a program guide that shows different programs that are currently airing and/or have finished currently airing recently in a grid format and indicate whether they are allowed to be restarted according to one embodiment.

FIG. 11 illustrates an exemplary user interface 1100 of the client device 140 that illustrates a program guide that shows different programs that are currently airing and/or have finished currently airing recently in a grid format and indicate whether they are allowed to be restarted according to one embodiment. As illustrated in FIG. 11, there are several different channels and their programs that are airing at certain times. If a program is restartable, a visual indicator is displayed in conjunction with the program. For example, Program 9 of channel 4 is allowed to be restarted and therefore the visual indicator 1115 is displayed and similarly, programs 11 and 13 of channel 5 are allowed to be restarted and corresponding visual indicators are displayed. As another visual indication, the channels that have programs in the current view that are allowed to be restarted are indicated with a different shape than channels that do not have programs in the current view that are allowed to be restarted. For example, the channel 4, which includes the Program 9 that is allowed to be restarted, has an arrow shape visual indicator 1110; whereas channel 3, which does not include any media programs in the current view that are allowed to be restarted, as a rectangle shape. As illustrated in FIG. 11, the client device 140 has received a selection to show more details regarding Program 6 1105. For example, the user has used a remote or other input device to highlight Program 6, which causes detail information 1140 to be displayed. Since Program 6 is not allowed to be restarted, the detail information 1140 does not indicate that the program is allowed to be restarted.

Figure 12:
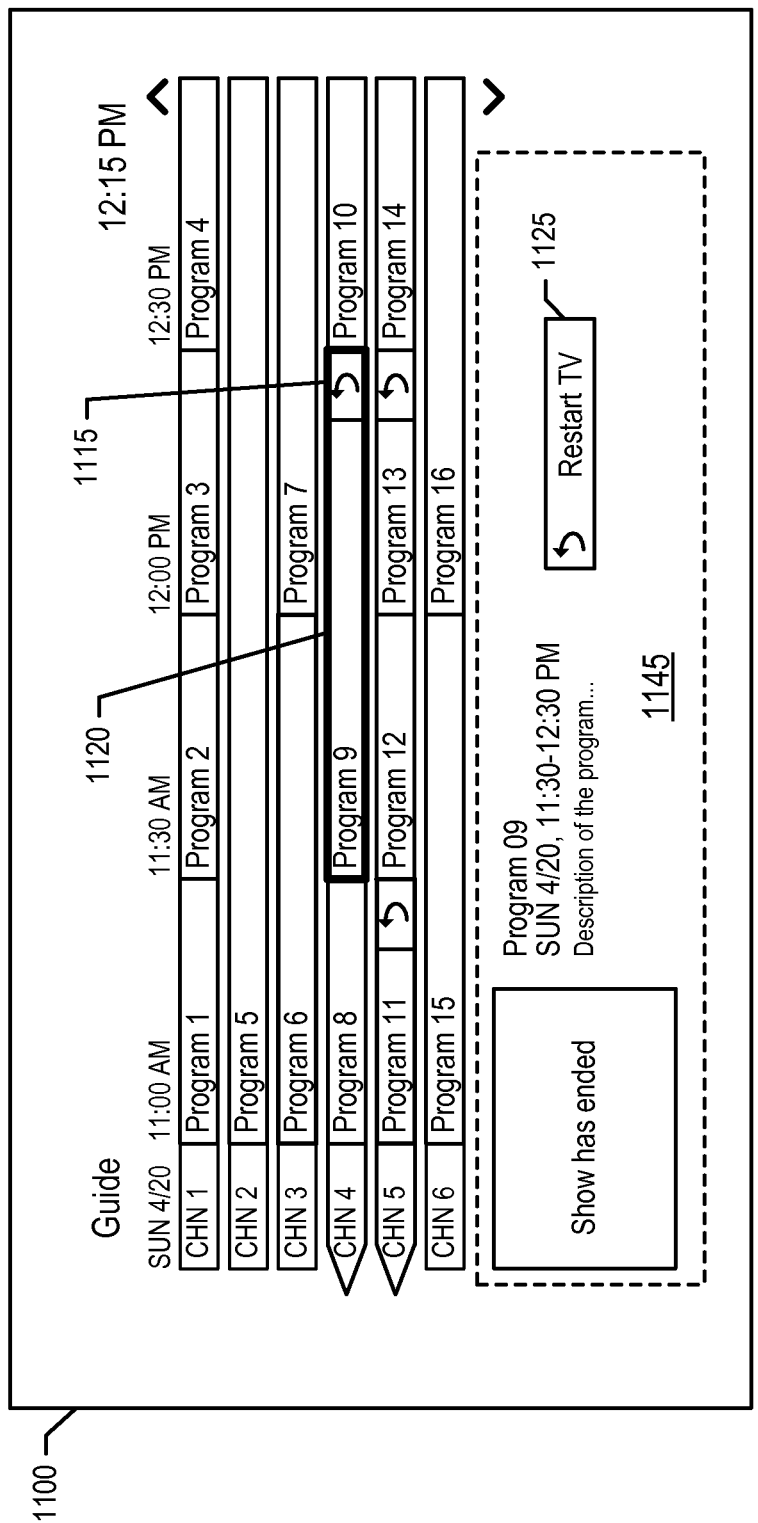
FIG. 12 illustrates the exemplary user interface of a client device when the client device has received a selection to show more details of a media program according to one embodiment.

FIG. 12 illustrates the exemplary user interface 1100 where the client device 140 has received a selection to show more details of a media program according to one embodiment. As illustrated in FIG. 12, the client device 140 has received a selection to show more details regarding Program 9 1120, which causes the detail information 1145 to be displayed. Since Program 9 is allowed to be restarted, the visual indicator 1125 is displayed in the detail information 1145. Upon receiving a selection from a user of the client device of the indicator 1125, in some embodiments a request to restart the program from its beginning is transmitted to the timeshift server 120 and in other embodiments a program information user interface is displayed to the user, which will be described in greater detail with respect to FIG. 13.

Figure 13:
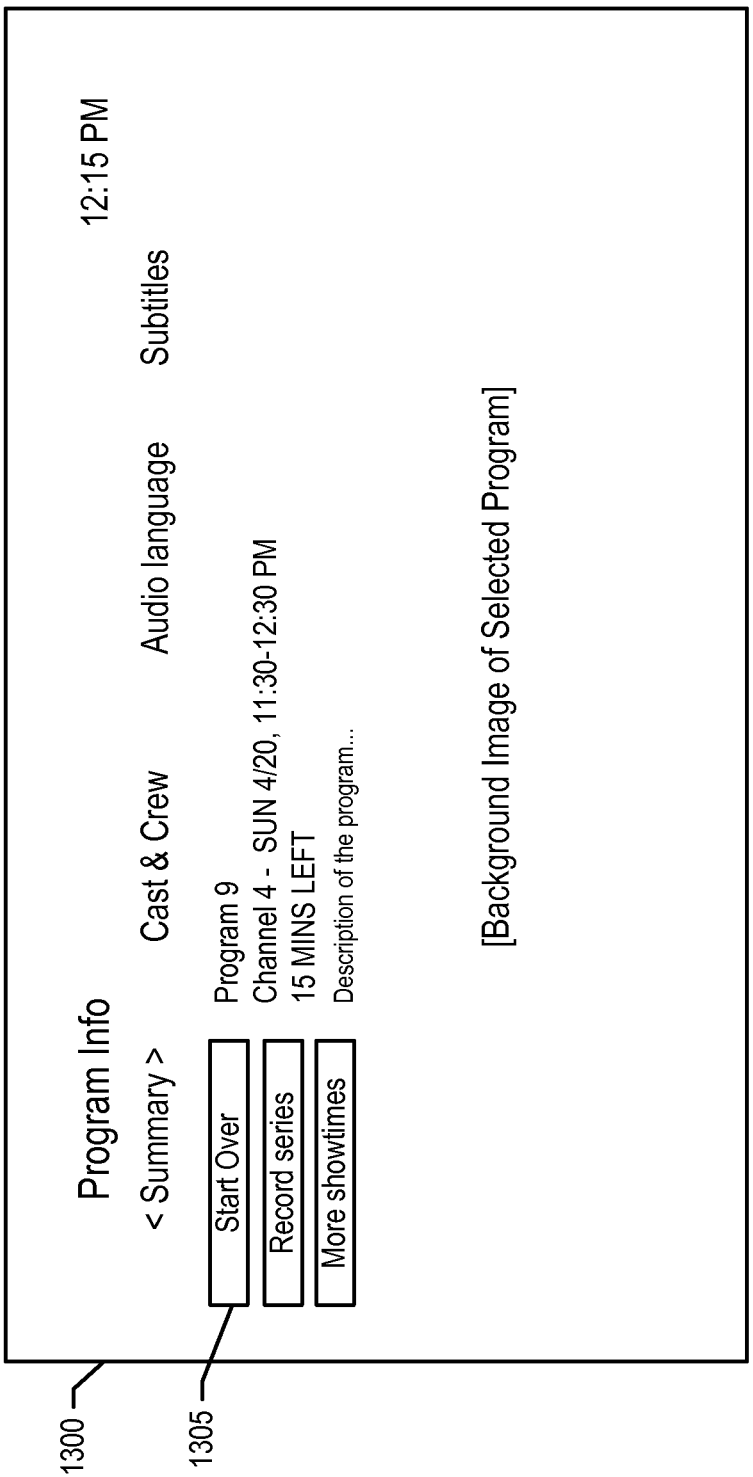
FIG. 13 illustrates an exemplary user interface of a client device including program information page (referred to as the program information user interface) according to one embodiment.

FIG. 13 illustrates an exemplary user interface 1300 of the client device 140 that includes program information (referred to as the program information user interface) according to one embodiment. The user interface 1300 illustrates more information regarding Program 9, which as previously described with respect to FIGS. 11-12, is allowed to be restarted. Among other information items regarding the program, the interface 1300 includes a visual indicator 1305 that indicates that Program 9 is allowed to be restarted from its beginning. Upon receiving a selection of the visual indicator 1305, the client device 140 is configured to transmit a request to the timeshift server 120 for the program to be restarted from its beginning.

Referring back to FIG. 2, sometime after receiving from the client device 140 the request for an operation on one of the programs indicated as being restartable, the timeshift server 120 enforces the set of restrictions based on the configuration at operation 240 and transmits the result of the operation to the client device at operation 245. For example, if the timeshift server 120 receives a request to play a media program from the client device 140, the timeshift server 120 determines whether the request can be fulfilled and if so transmits the media program to the client device 140. In one embodiment, the timeshift server 120 may perform one or more actions when enforcing the restrictions including determining whether the requested operation is allowed and determining whether the requesting client device is authorized for the requested operation. For example, if the requested operation is to play a media program, the timeshift server 120 may determine whether the media program is allowed to be restarted generally and/or allowed to be restarted by the particular client device 140 (e.g., whether a user associated with the client device 140 is authorized for restart service; whether a user associated with the client device 140 is in a location subject to blackout restrictions, etc.). As another example, if the requested operation is to play the media program at a different speed or pause (e.g., for a trick mode such as fast-forward, rewind, or pause), the timeshift server 120 may determine whether the media program is allowed to be played at a different speed or be paused.

If the request cannot be fulfilled, the timeshift server 120 transmits a response to the client device that indicates that the request cannot be fulfilled. For example, if the request is to play the media program at a different speed (e.g., fast-forward the media program) and the timeshift server 120 determines that the media program is not allowed to be played at a different speed, the timeshift server 120 transmits a message to the client device 140 that indicates that playback at that different speed is not allowed. The client device 140 may, in response to receiving the message, display an indicator on the user interface playing the media program that indicates that playback of the media program at the different speed is not allowed. If the request can be fulfilled, however, the timeshift server 120 transmits the result of the requested operation. For example, if the request is to play the media program at a different speed and that different speed is allowed, the timeshift server 120 may transmit the media program playing at the requested different speed to the client device 140.

Figure 19:
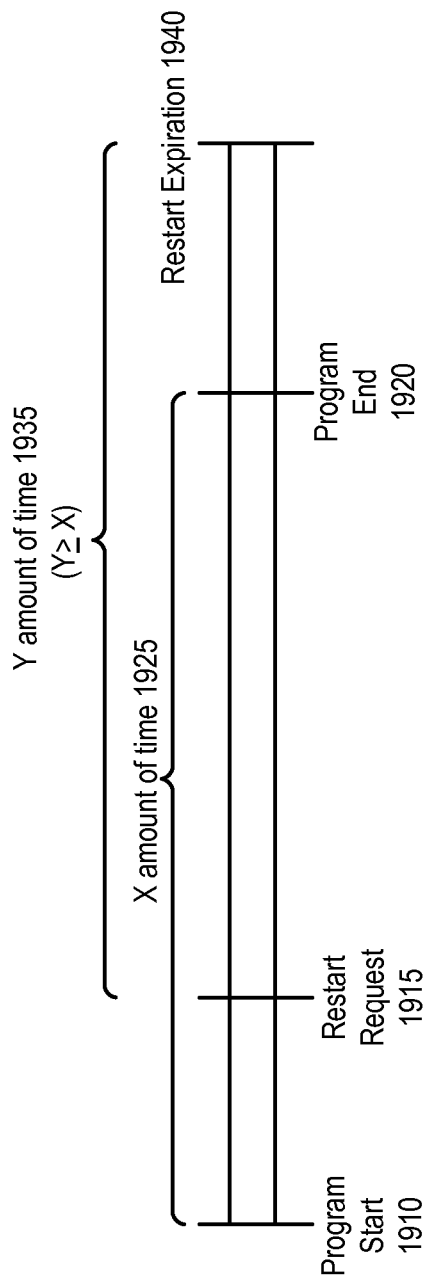
FIG. 19 illustrates an example of a media program expiring in a currently airing restriction according to one embodiment.

As previously described herein, one of the restrictions that may be configured is a currently airing restriction that allows the media program to be played by a client device only when that media program is currently airing in a locale of the client device, and that media program will become unavailable for viewing after a predefined amount of time has elapsed after the currently airing media program ends. The predefined amount of time may be different in different embodiments. The predefined amount of time is greater than or equal to the scheduled duration of the program (e.g., if the program is one hour in length, the program will not expire until at least one hour after it is restarted). FIG. 19 illustrates an example of a media program expiring in a currently airing restriction. At a time 1910, the media program starts in a locale of the client device and the program is scheduled to end at a time 1920. The scheduled duration of the program is indicated in FIG. 19 as X amount of time 1925. Sometime during the airing of the program, at a time 1915, a request for restarting the program is received from the client device. The restarted program will expire at a time 1940. The amount of time until expiration of the restarted program is illustrated in FIG. 19 as Y amount of time 1935, where Y is greater than or equal to X. The predefined amount of time may be configured by the operator and/or content provider.

In response to receiving from the client device 140 a request to restart a media program that is subject to a currently airing restriction, the timeshift server 120 determines whether at a time of the request the media program is currently airing in a locale of the client device 140. If it is, then the media program is streamed to the client device 140 for playback. If it is not (the media program is not currently airing), then the timeshift server 120 transmits a message to the client device 140 that indicates that the media program is not allowed to be restarted.

Figure 14:
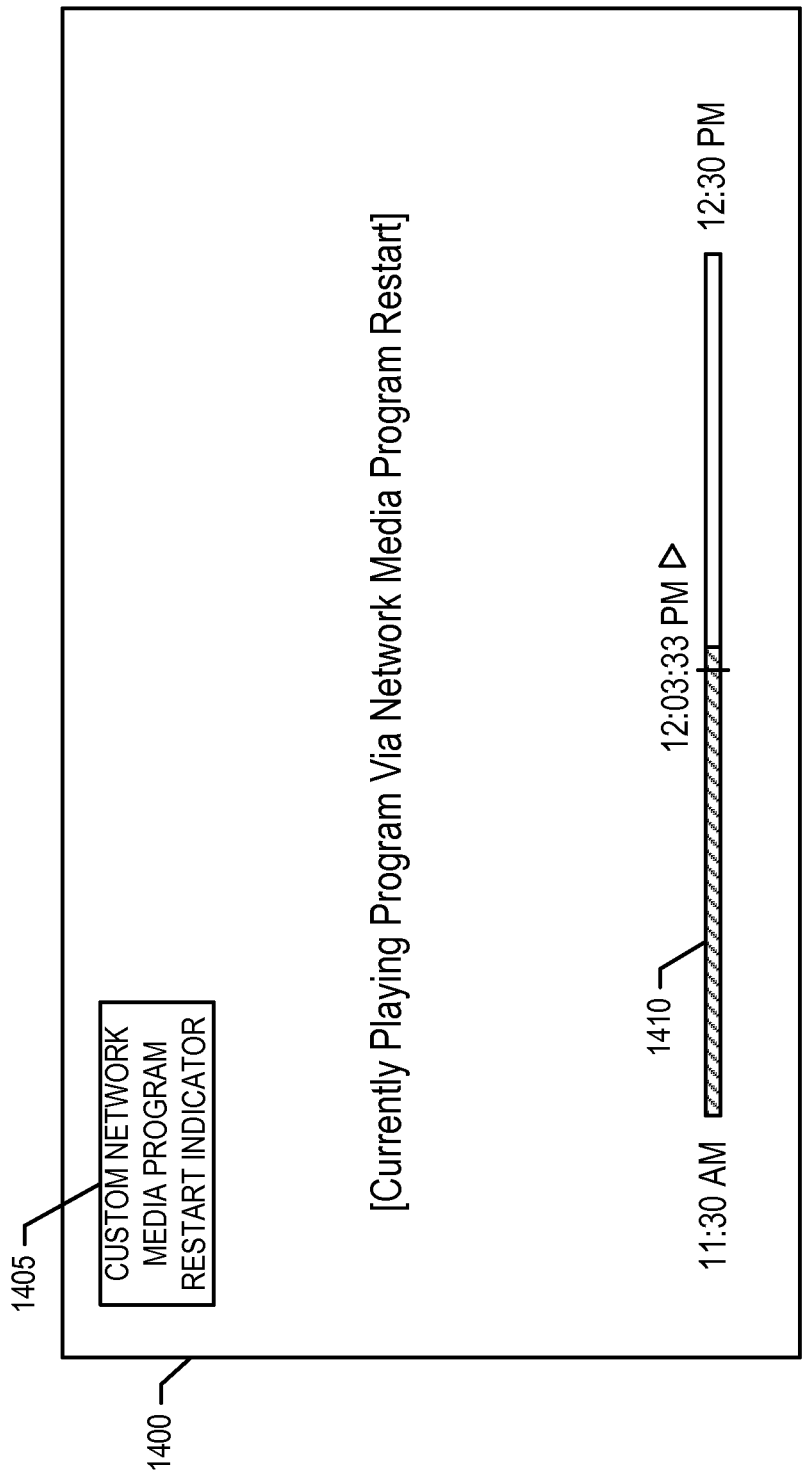
FIG. 14 illustrates an exemplary user interface of a client device that is displayed when the client device is playing a media program via network media program restart according to one embodiment.

FIG. 14 illustrates an exemplary user interface 1400 of the client device 140 that is displayed when the client device 140 is playing a media program via the network media program restart according to one embodiment. The interface 1400 includes a network media program restart indicator 1405 that is overlaid on top of the currently playing program. In one embodiment, the indicator 1405 is an image that may be configurable by the operator or content provider. The image may be transmitted to the client device 140 with the configuration (e.g., with the timeshift map) or through a different message. The size and position of the indicator 1405 may also be configurable by the operator or content provider. The interface 1400 also includes a status bar 1410 that provides a visual indicator of how much time is remaining in the program. In one embodiment the status bar 1410 is displayed in response to the client device 140 receiving a selection of more information regarding the currently playing program.

Figure 15:
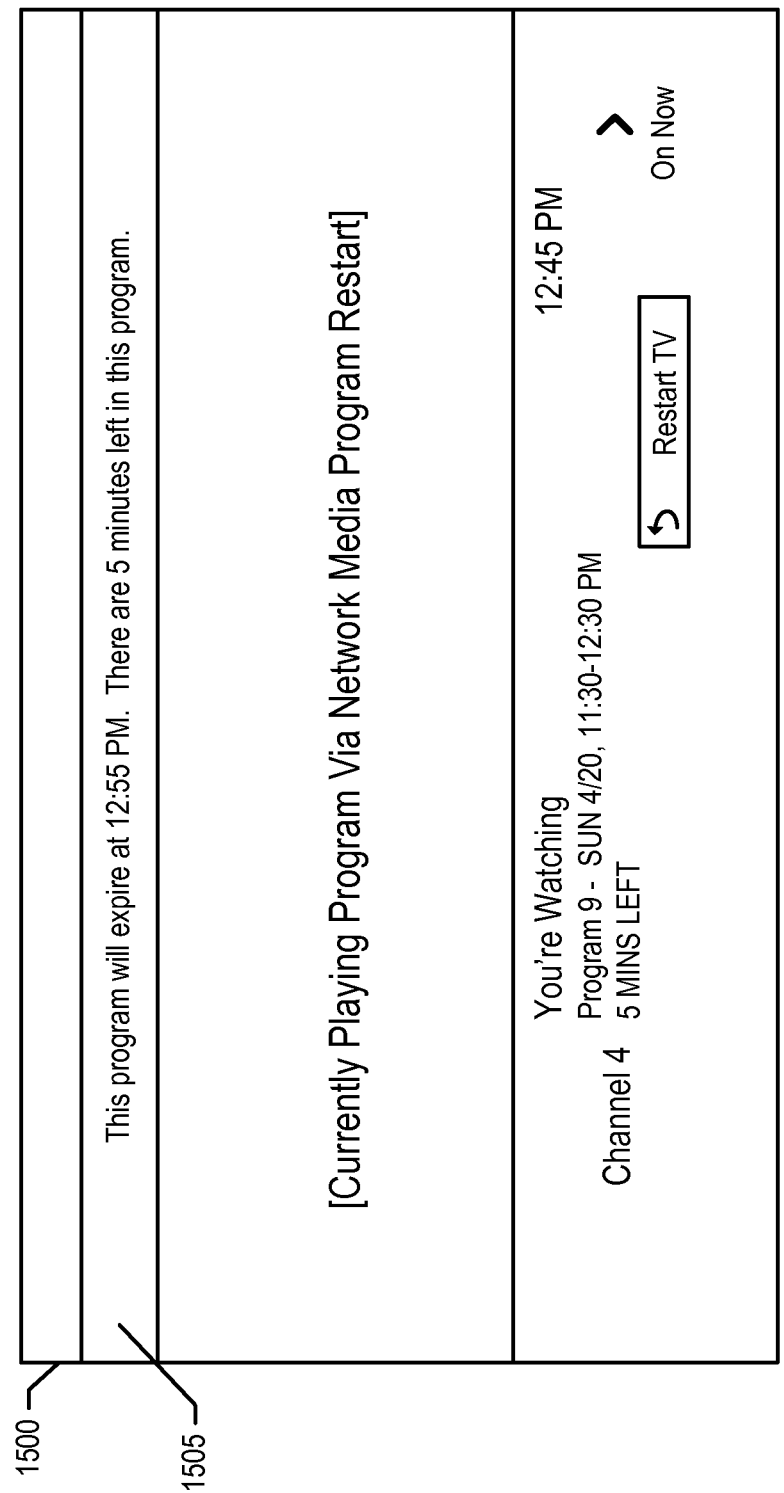
FIG. 15 is an exemplary user interface of a client device that is displayed when the client device is playing a media program via network media program restart that is nearing its expiration according to one embodiment.

FIG. 15 is an exemplary user interface 1500 of the client device 140 that is displayed when the client device 140 is playing a media program via the network media program restart that is nearing its expiration according to one embodiment. In some embodiments, media programs are allowed to be restarted and played for only a limited amount of time. For example, if the currently airing restriction is enabled for a media program, that program will become unavailable after a predefined amount of time has elapsed after the currently airing media program ends. The interface 1500 includes a banner 1505 overlaid on top of the currently playing program that indicates when the program will expire and/or how much time is left in the program.

Figure 16:
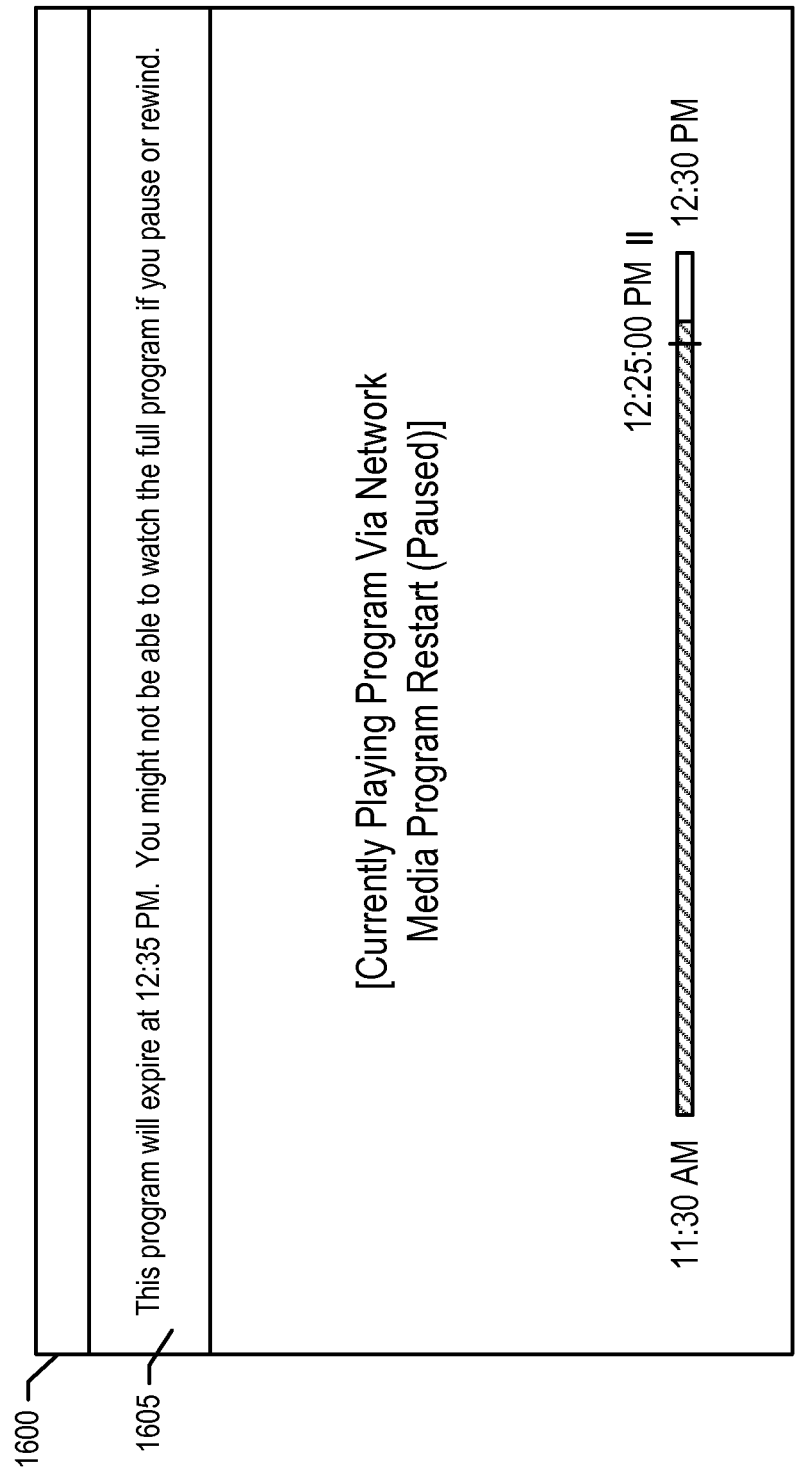
FIG. 16 is an exemplary user interface of a client device that is displayed when the client device is playing a media program via the network media program restart and receives a request for a pause or rewind operation on a media program that has an expiration time according to one embodiment.

FIG. 16 is an exemplary user interface 1600 of the client device 140 that is displayed when the client device 140 is playing a media program via the network media program restart and receives a request for a pause or rewind operation on a media program that has an expiration time according to one embodiment. The interface 1600 includes a banner 1605 that is overlaid on top of the currently playing program that is displayed if the client device 140 receives a selection to pause or rewind the media program (if allowed) that indicates when the program will expire and alerts the user that if the user pauses or rewinds the media program, they may not be able to watch the full program before it expires.

Figure 17:
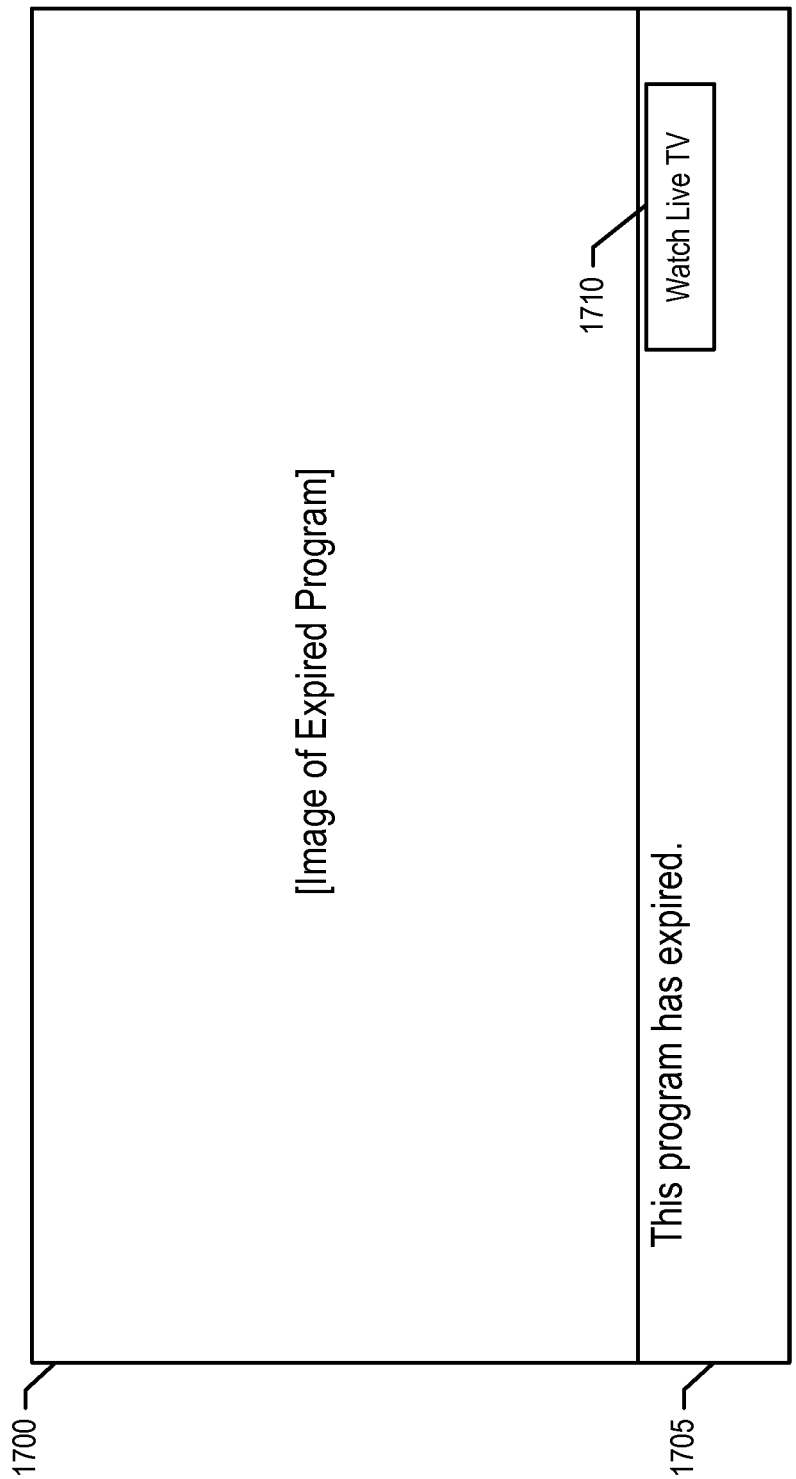
FIG. 17 is an exemplary user interface of a client device that is displayed when the restricted time range on playing a media program has elapsed according to one embodiment.

FIG. 17 is an exemplary user interface 1700 of the client device 140 that is displayed when the restricted time range on playing a media program has elapsed according to one embodiment. The interface 1700 includes a banner 1705 that indicate that the program has expired and includes an indicator 1710 that is configured to, upon selection, return the user to live programming.

Figure 18:
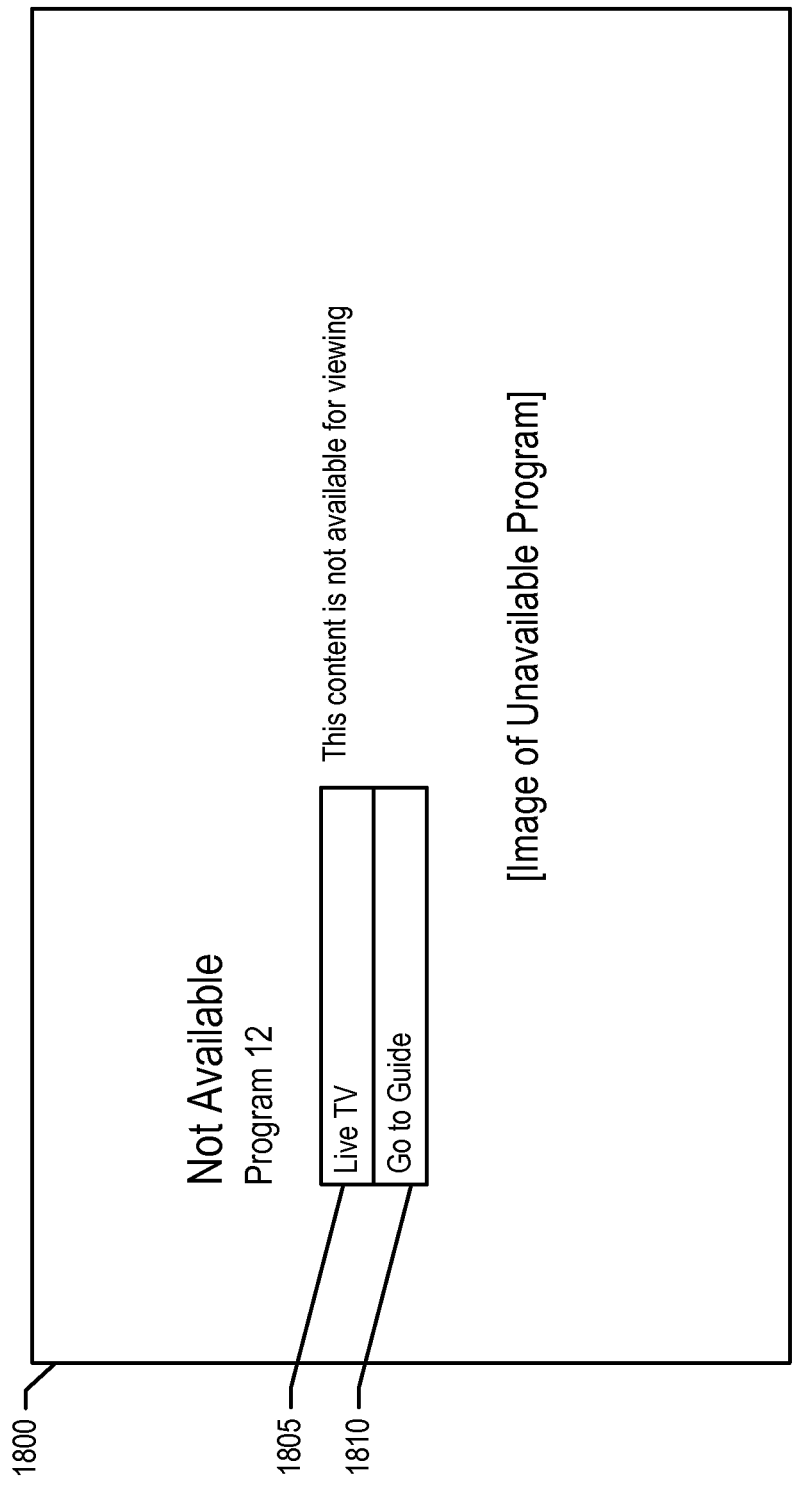
FIG. 18 is an exemplary user interface of a client device that is displayed when the client device receives input to transition from a past program that is allowed to be restarted to another past program that is not allowed to be restarted according to one embodiment.

FIG. 18 is an exemplary user interface 1800 of the client device 140 that is displayed when the client device 140 receives input to transition from a past program that is allowed to be restarted to another past program that is not allowed to be restarted according to one embodiment. The interface includes an indicator 1805 that, upon selection, returns the user to live programming; and an indicator 1810 that, upon selection, causes a program guide to be displayed to the user.

Figure 3:
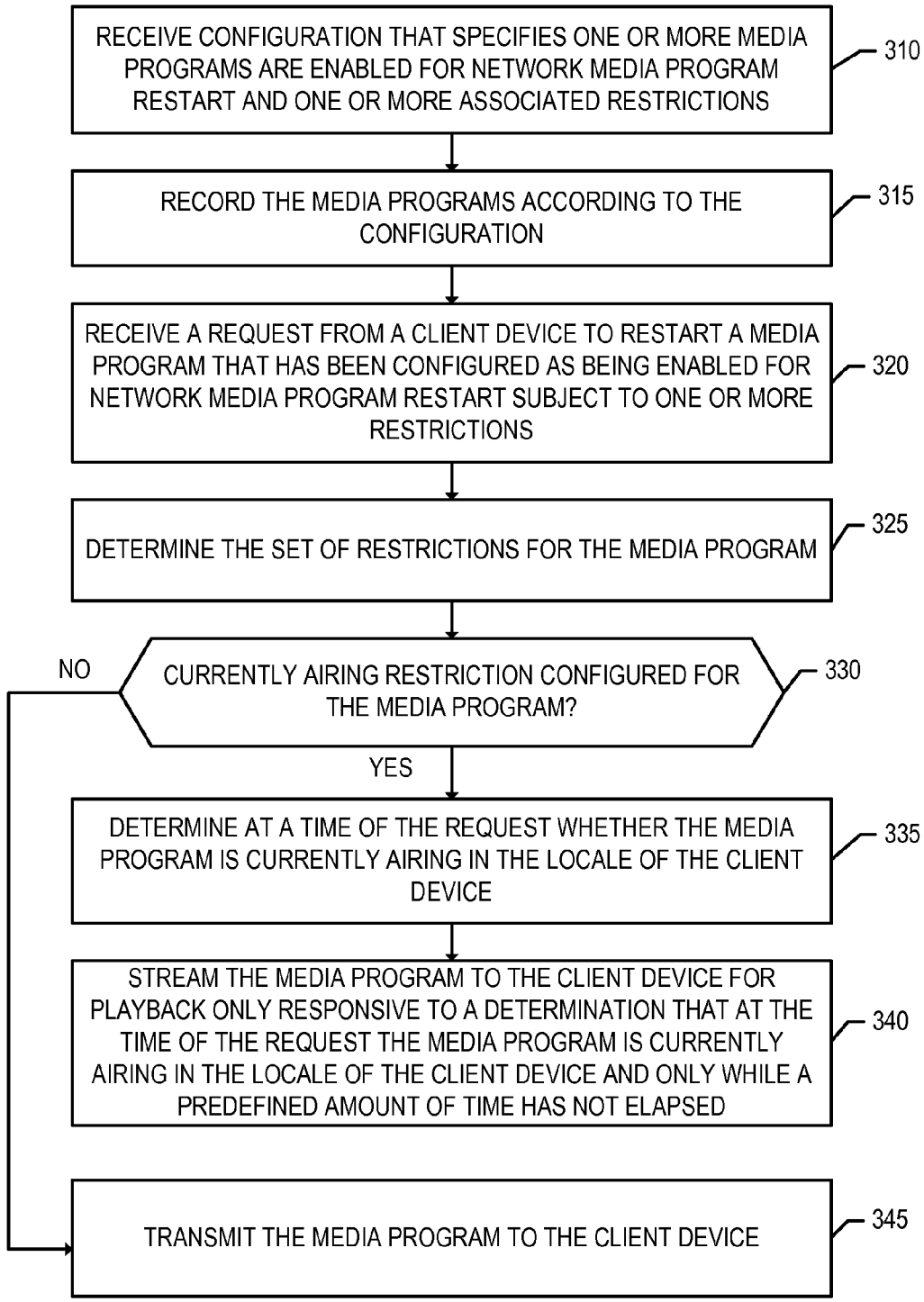
FIG. 3 is a flow diagram that illustrates exemplary operations performed on a server for network media program restart according to one embodiment.

FIG. 3 is a flow diagram that illustrates exemplary operations performed on a server for network media program restart according to one embodiment. FIG. 3 will be described with respect to the server being the timeshift server 120; however the operations of FIG. 3 are not limited to a particular server.

At operation 310, the timeshift server 120 receives a configuration that specifies that one or more media programs are enabled for network media program restart and a set of one or more restrictions associated with those one or more media programs. In one embodiment, the configuration is received in media streams from the acquisition server 115. In another embodiment the configuration is received in file(s) separate from the media streams from the acquisition server 115 or other device. Flow then moves to operation 315 where the timeshift server 120 records the media programs according to the received configuration and stores the recorded programs in a data store. For example, if the configuration indicates that a first media program of the media stream is not allowed to be restarted, the timeshift server 120 will not record the first media program; if the configuration indicates that a second media program of the media stream is allowed to be restarted, the timeshift server 120 records the second media program and stores it in the recorded programs 130. Flow then moves to operation 320.

At operation 320, the timeshift server 120 receives a request from a client device (e.g., the client device 140) to restart a media program that has been configured as being enabled for network media program restart subject to one or more restrictions. Flow then moves to operation 325 where the timeshift server 120 determines the set of restrictions for the media program. For example, the timeshift server 120 accesses the configuration for the media program to determine the set of restrictions.

Flow moves from operation 325 to operation 330 where the timeshift server 120 determines whether the currently airing restriction is configured for the media program, where the currently airing restriction allows that media program to be played by a client device only when that media program is currently airing in a locale of the client device and that media program will become unavailable for viewing after a predefined amount of time has elapsed after the currently airing program ends. If the currently airing restriction is configured for the media program, then flow moves to operation 335. If the currently airing restriction is not configured for the media program, then flow moves to operation 345 where the media program is transmitted to the client device (e.g., the media program is streamed to the client device). At operation 335 (the currently airing restriction is configured for the media program), the timeshift server 120 determines whether at a time of the request, the media program is currently airing in the locale of the client device. In one embodiment this determination is made by accessing a data store that includes information that identifies the locale of the client device (e.g., a data store that includes a location of the client device or user subscription information).

Flow then moves to operation 340 where the timeshift server 120 streams the media program to the client device only responsive to determining that at the time of the request the media program is currently airing in the locale of the client device and only when the predefined amount of time has not elapsed. In one embodiment, the media program streamed using a streaming protocol such as Real-Time Transport Protocol (RTP). For example, if the user pauses or rewinds the media program (if allowed), the user may not be able to view the entire program. Once the program has reached its expiration time, the timeshift server 120 stops streaming the program to the client device.

Figure 4:
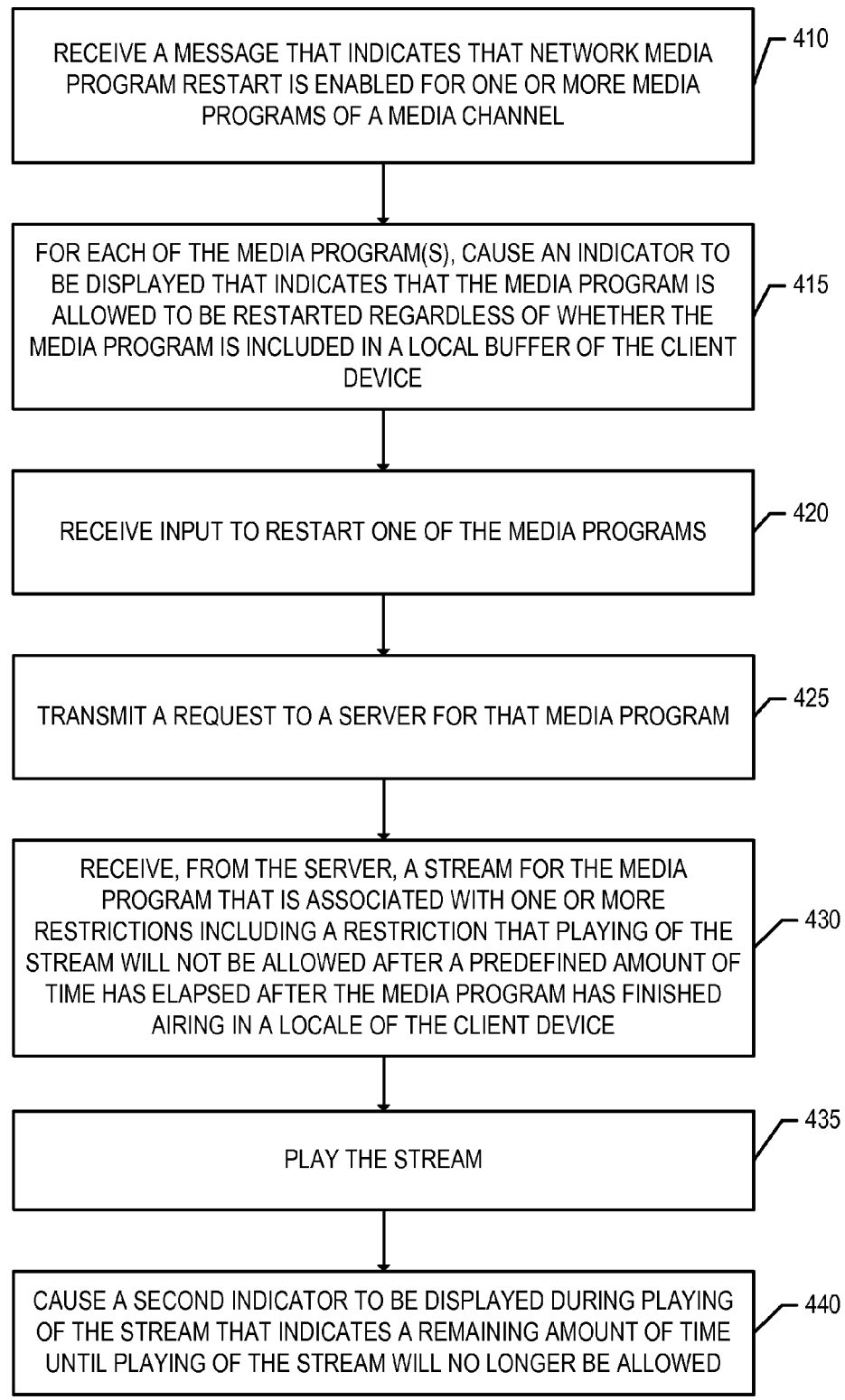
FIG. 4 is a flow diagram that illustrates exemplary operations performed on a client device for network media program restart according to one embodiment.

FIG. 4 is a flow diagram that illustrates exemplary operations performed on a client device for network media program restart according to one embodiment. At operation 410, the client device receives a message that indicates that network media program restart is enabled for one or more media programs of a media channel. For example, the message may be a timeshift map that specifies the media program(s) that are enabled for network media program restart. Next, at operation 415, for each of those media program(s), the client device causes an indicator to be displayed that indicates that the media program is allowed to be restarted regardless of whether the media program is included in a local buffer of the client device. Examples of indicators that are displayed are illustrated in FIGS. 9-13 as previously described herein.

Next, at operation 420, the client device receives input to restart one of the media programs. The client device can receive the input differently in different embodiments. For example, the client device may receive the input as a result of a user using a remote to select a restart indicator for the media program in one embodiment or a dedicated restart button on the remote. In another embodiment, the client device may receive the input to restart the media program through a voice command from the user. In another embodiment, the client device may receive the input to restart the media program through touchscreen input. Flow then moves to operation 425.

At operation 425, the client device transmits a request to a server for the media program. Next, at operation 430, the client device receives, from the server, a stream for the media program that is associated with one or more restrictions including a restriction that playing of the stream will not be allowed after a predefined amount of time has elapsed after the media program has finished airing in a locale of the client device. Flow then moves to operation 435, where the client device plays the stream. Next, at operation 440, the client device causes a second indicator to be displayed during playing of the stream that indicates a remaining amount of time until playing of the stream will no longer be allowed. In one embodiment, the server will stop streaming the stream when the predefined amount of time has elapsed after the media program has finished airing in the locale of the client device. In another embodiment, the client device is configured to stop playing the media program when the predefined amount of time has elapsed.

Figure 5:
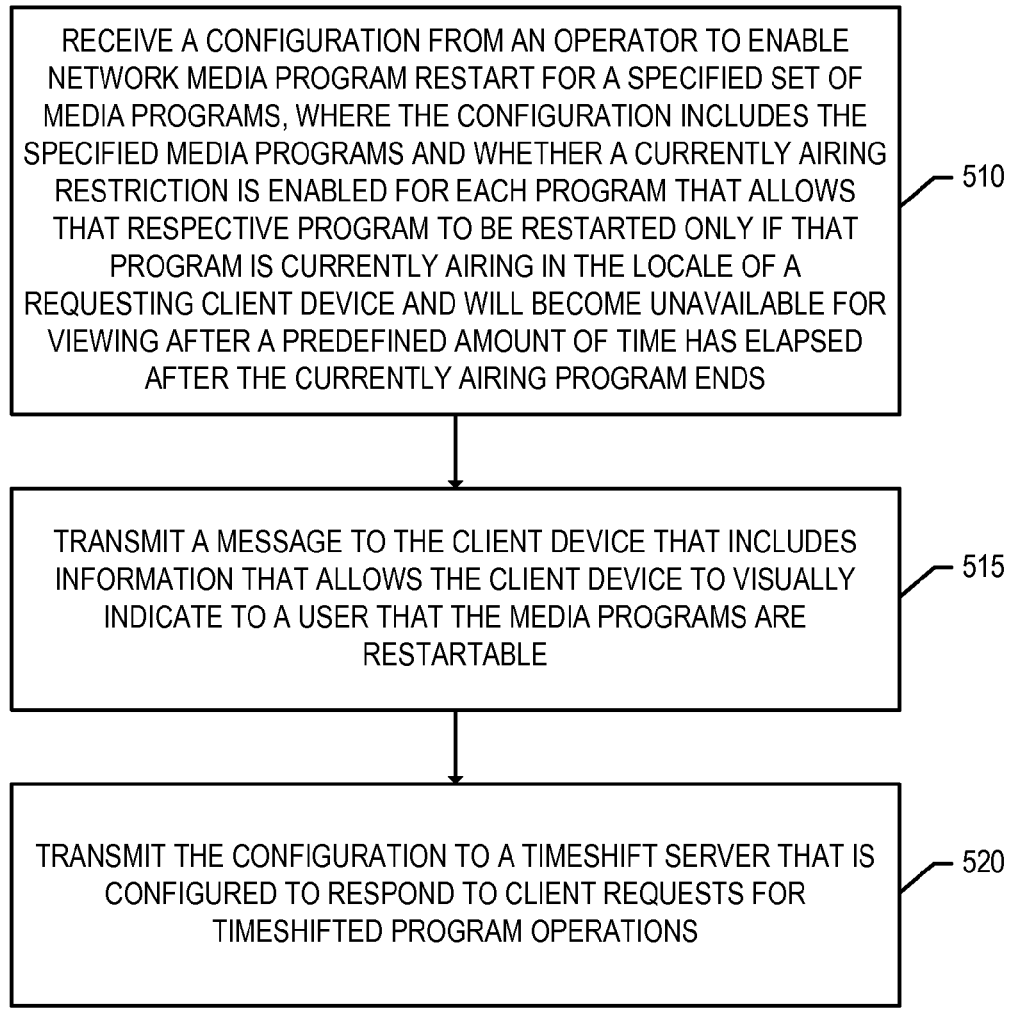
FIG. 5 is a flow diagram that illustrates exemplary operations for configuring network media program restart according to one embodiment.

FIG. 5 is a flow diagram that illustrates exemplary operations for configuring network media program restart according to one embodiment. The operations of FIG. 5 will be described with respect to the exemplar embodiment of FIG. 1. However, it should be understood that embodiment described with respect to FIG. 1 can perform operations different than those described with respect to FIG. 5, and the operations described with respect to FIG. 5 can be performed by embodiments different than those of FIG. 1.

At operation 510, the acquisition server 115 receives a configuration from an operator to enable network media program restart for a specified set of media programs. The configuration specifies the media programs and at least whether a currently airing restriction is enabled for each program that allows that respective program to be restarted only if that program is currently airing in the locale of a requesting client device and that program will become unavailable for viewing after a predefined amount of time has elapsed after the currently airing program ends. Flow then moves to operation 515 where the acquisition server 115 transmits a message to a client device that includes information that allows the client device to visually indicate to a user that the media programs are restartable. For example, the acquisition server 115 transmits a timeshift map that specifies the media program(s) that are enabled for network media program restart. Flow then moves to operation 520 where the acquisition server 115 transmits the configuration to a timeshift server that is configured to respond to client requests for timeshifted program operations (e.g., play, trick mode (e.g., fast-forward, rewind, pause)).

Figure 7:
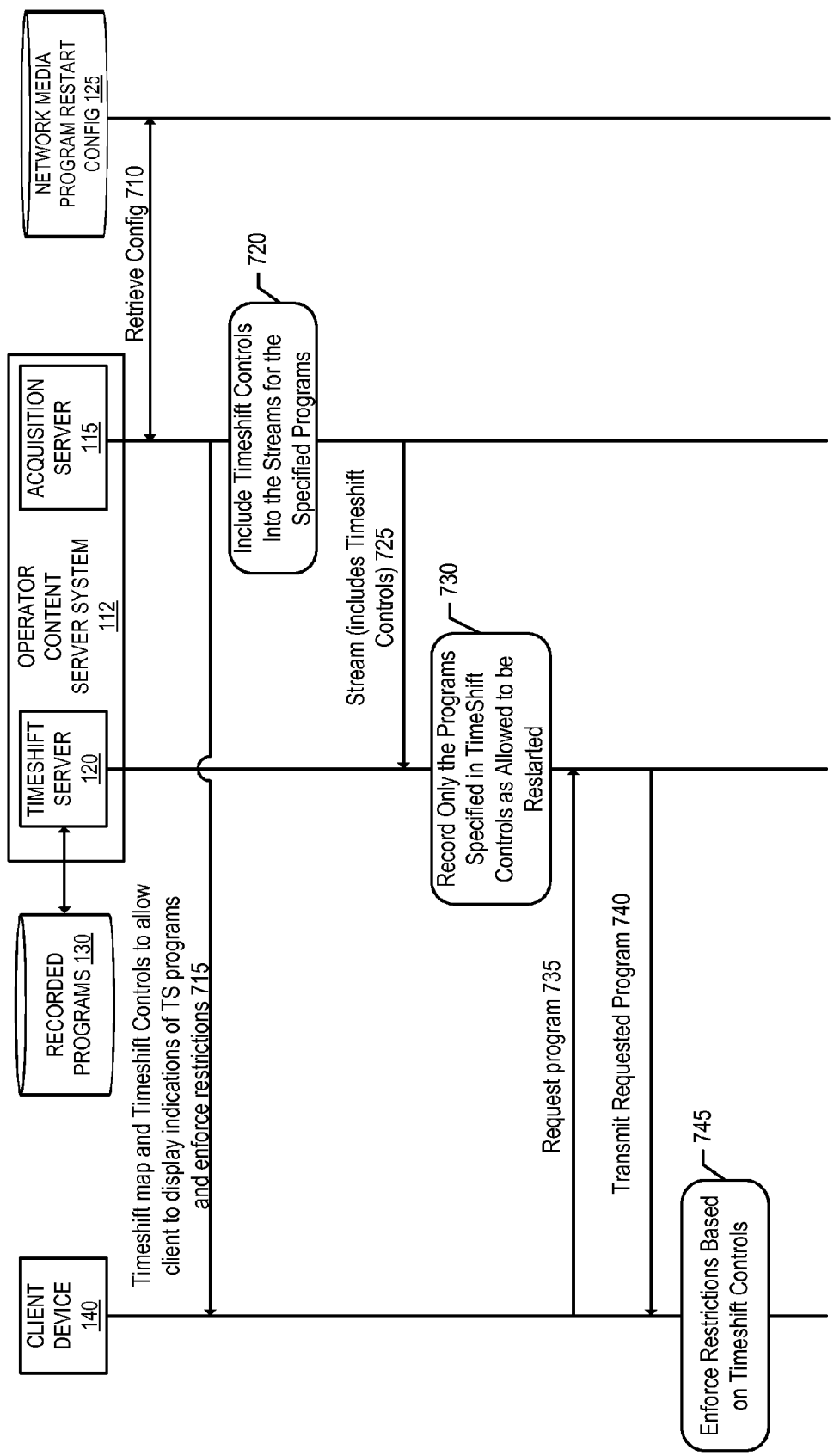
FIG. 7 illustrates an exemplary flow of operations for network media program restart according to another embodiment.

FIG. 7 illustrates an exemplary flow of operations for network media program restart according to another embodiment. The operations of FIG. 7 are similar to the operations of FIG. 2. However, the embodiment described with respect to FIG. 7 includes the client device 140 enforcing at least some of the restrictions on the network media program restart instead of the timeshift server 120.

At operation 710, the acquisition server 115 retrieves the configuration for network media program restart from the data store 125 in a similar way as described with respect to operation 210 of FIG. 2. Sometime after retrieving the configuration, at operation 715 the acquisition server 115 transmits a timeshift map to the client device 140 that specifies the media program(s) that are enabled for network media program restart to allow the client device 140 to display indications of which programs are allowed to be restarted, and timeshift controls that define restrictions for the network media program restart to the client device 140. Although not illustrated in FIG. 7, a channel map may also be transmitted to the client device 140 that provides a list of channels that are accessible by the client device 140, which are used by the client device 140 to determine what channels to display to the user (e.g., in a program guide).

Also after retrieving the configuration, at operation 720 the acquisition server 115 includes timeshift controls that specify one or more restrictions on the network media program restart (based on the retrieved configuration) into the streams for the specified media programs. The content stream, which includes the timeshift controls, is streamed to the timeshift server 120 at operation 725. The timeshift server 120 records only the programs specified in the timeshift controls as being enabled for network media program restart and subject to any restrictions included in the timeshift controls at operation 730 in a similar way as described with respect to operation 230 of FIG. 2.

At operation 735, the timeshift server 120 receives from the client device 140 a request for a media program that is configured as being allowed to be restarted. Prior to transmitting the request, the client device 140 may determine whether the request can be granted. For example, upon receiving input to restart a media program that is subject to a currently airing restriction, the client device 140 determines whether that media program is currently airing. If it is not airing, then the request for the media program cannot be granted and therefore the client device 140 will not transmit the request for the program to the timeshift server 120. However, if the program is currently airing, the client device 140 will transmit a request to the timeshift server 120 for the program.

At operation 740, the client device 140 receives the requested program from the timeshift server 120 and at operation 745 the client device 140 plays the media program and enforces the restrictions based on the previously received timeshift controls. For example, if the timeshift controls indicate that a trick mode is not allowed (e.g., a request received from the user to fast-forward, rewind, or pause playback of the media program), the client device 140 will not perform the trick mode accordingly.

Figure 8:
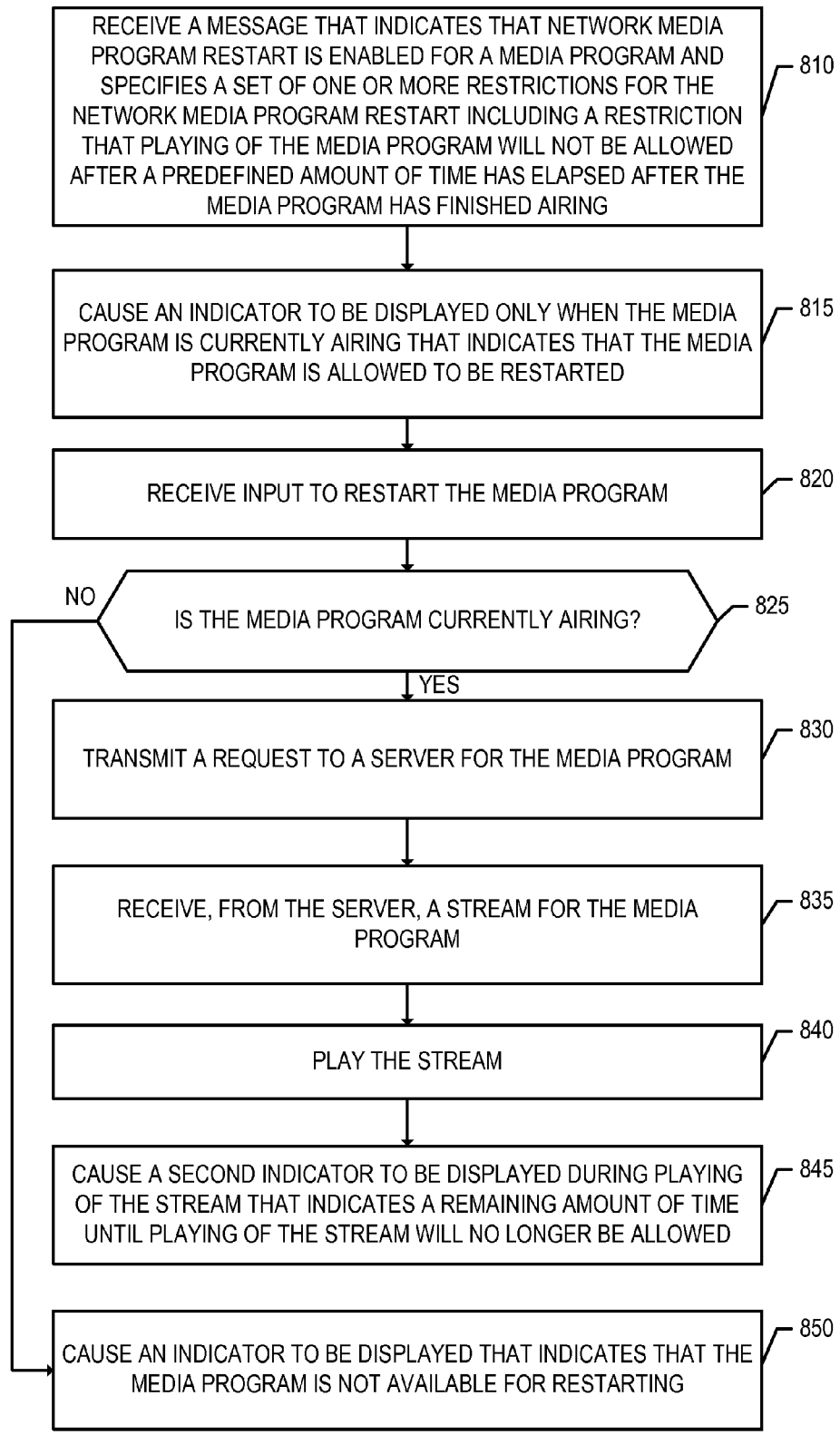
FIG. 8 is a flow diagram that illustrates exemplary operations performed on a client device for network media program restart according to another embodiment.

FIG. 8 is a flow diagram that illustrates exemplary operations performed on a client device for network media program restart according to another embodiment. At operation 810, the client device receives a message that indicates that network media program restart is enabled for a media program and specifies a set of one or more restrictions for the network media program restart including a restriction that playing of the media program will not be allowed after a predefined amount of time has elapsed after the media program has finished airing in a locale of the client device. For example, the client device may receive a timeshift map that indicates which media program(s) are enabled for network media program restart and timeshift controls that indicate the restriction(s) on those media program(s) for network media program restart.

Next, at operation 815, the client device causes an indicator to be displayed only when the media program is currently airing that indicates that the media program is allowed to be restarted. Flow then moves to operation 820 where the client device receives input to restart the media program. The input may be received as previously described herein. Next, at operation 825, the client device determines whether the media program is currently airing. If the media program is not currently airing, then flow moves to operation 850 where the client device causes an indicator to be displayed that indicates that the media program is not available for restarting. If the media program is currently airing, then flow moves to operation 830 where the client device transmits a request to a server for the media program. Flow moves from operation 830 to operation 835 where the client device receives, from the server, a stream for the requested media program. Next, at operation 840, the client device plays the stream. Next, at operation 845, the client device causes a second indicator to be displayed during playback of the stream that indicates a remaining amount of time until playing of the stream will no longer be allowed. In one embodiment, upon expiration of the time period, the client device stops playing the stream and does not allow the program to be further restarted. In another embodiment, upon expiration of the time period, the server stops transmitting the stream to the client device.

Figure 20:
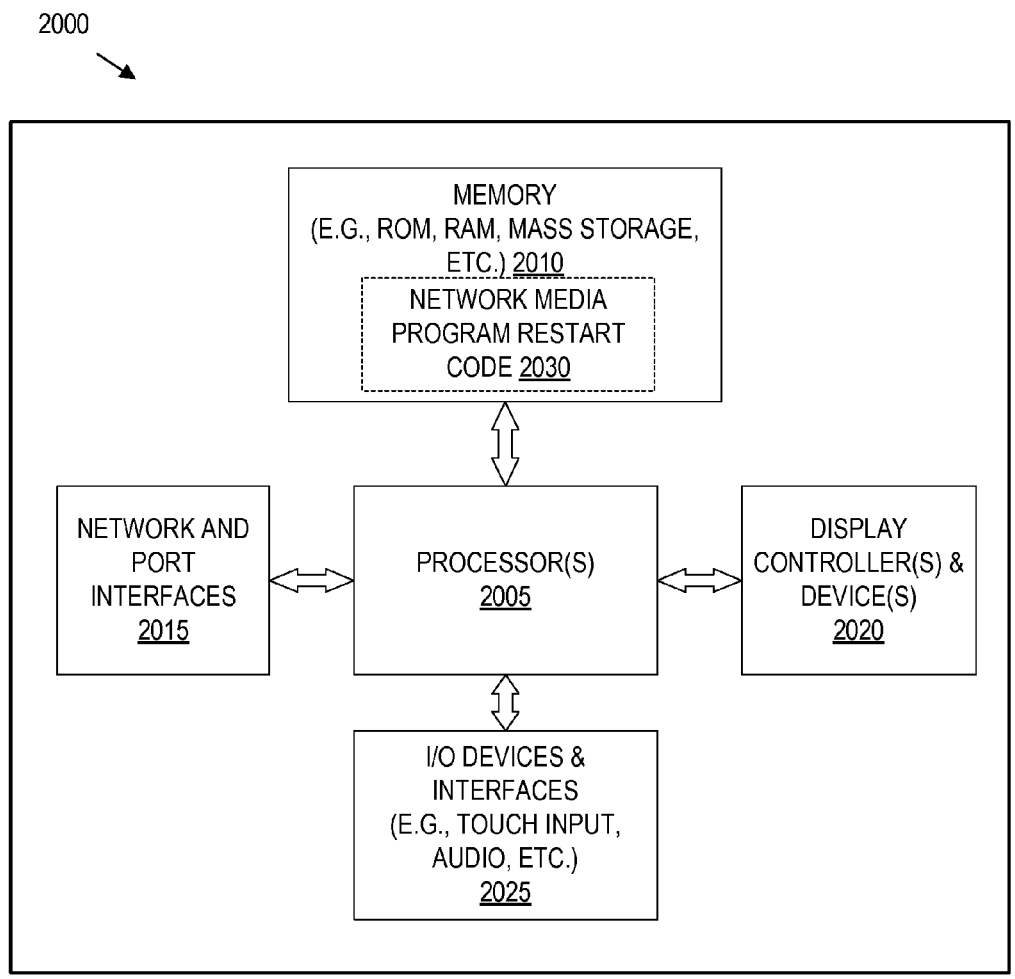
FIG. 20 illustrates a block diagram of an exemplary data processing system that may be used in some embodiments.

FIG. 20 illustrates a block diagram for an exemplary data processing system 2000 that may be used in some embodiments. Data processing system 2000 includes one or more microprocessors 2005 and connected system components (e.g., multiple connected chips). Alternatively, the data processing system 2000 is a system on a chip. One or more such data processing systems 2000 may be utilized to implement the functionality of the client devices 140A-N, acquisition server 115, and/or timeshift server 120 as illustrated in FIG. 1.

The data processing system 2000 includes memory 2010, which is coupled to the microprocessor(s) 2005. The memory 2010 may be used for storing data, metadata, and programs for execution by the microprocessor(s) 2005. For example, the depicted memory 2010 may store network media program restart code 2030 that, when executed by the microprocessor(s) 2005, causes the data processing system 2000 (e.g., client device 140) to create and/or present user interfaces to allow users to request programs be restarted and perform other operations as described herein. The memory 2010 may include one or more of volatile and non-volatile memories, such as Random Access Memory ("RAM"), Read Only Memory ("ROM"), a solid state disk ("SSD"), Flash, Phase Change Memory ("PCM"), or other types of data storage. The memory 2010 may be internal or distributed memory.

The data processing system 2000 also includes an audio input/output subsystem 2015 which may include a microphone and/or a speaker for, for example, playing back music or other audio, receiving voice instructions to be executed by the microprocessor(s) 2005, playing audio notifications, etc. A display controller and display device 2020 provides a visual user interface for the user, e.g., GUI elements or windows.

The data processing system 2000 also includes one or more input or output ("I/O") devices and interfaces 2025, which are provided to allow a user to provide input to, receive output from, and otherwise transfer data to and from the system. These I/O devices 2025 may include a mouse, keypad, keyboard, a touch panel or a multi-touch input panel, camera, optical scanner, network interface, modem, other known I/O devices or a combination of such I/O devices. The touch input panel may be a single touch input panel which is activated with a stylus or a finger or a multi-touch input panel which is activated by one finger or a stylus or multiple fingers, and the panel is capable of distinguishing between one or two or three or more touches and is capable of providing inputs derived from those touches to the processing system 2000.

The I/O devices and interfaces 2025 may also include a connector for a dock or a connector for a USB interface, FireWire, Thunderbolt, Ethernet, etc., to connect the system 2000 with another device, external component, or a network. Exemplary I/O devices and interfaces 2025 also include wireless transceivers, such as an IEEE 802.11 transceiver, an infrared transceiver, a Bluetooth transceiver, a wireless cellular telephony transceiver (e.g., 2G, 3G, 4G), or another wireless protocol to connect the data processing system 2000 with another device, external component, or a network and receive stored instructions, data, tokens, etc. It will be appreciated that one or more buses may be used to interconnect the various components shown in FIG. 20.

It will be appreciated that additional components, not shown, may also be part of the system 2000, and, in certain embodiments, fewer components than that shown in FIG. 20 may also be used in a data processing system 2000. For example, in some embodiments where the data processing system 2000 is a set top box, the set top box may include components such as a digital broadcast receiver (e.g., satellite dish receiver, radio frequency (RF) receiver, microwave receiver, multicast listener, etc.) and/or a tuner that tunes to appropriate frequencies or addresses of received content. For example, a tuner may be configured to receive digital broadcast data in a particularized format, such as MPEG-encoded digital video and audio data, as well as digital data in many different forms, including software programs and programming information in the form of data files. As another example, the set top box may include a key listener unit to receive authorization and/or session keys transmitted from a server. The keys received by listener unit may be used by cryptographic security services implemented in a protection mechanism in the set top box to enable decryption of the session keys and data.

While the flow diagrams in the figures show a particular order of operations performed by certain embodiments of the invention, it should be understood that such order is exemplary (e.g., alternative embodiments may perform the operations in a different order, combine certain operations, overlap certain operations, etc.).

Additionally, while the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method in a server for network media program restart, comprising:
   receiving a first request from a client device to restart a media program from a beginning of the media program, wherein the media program has been configured as being enabled for network media program restart subject to a set of one or more restrictions;
   determining the set of restrictions for the media program;
   determining that a currently airing restriction is configured as one of the set of restrictions that allows the media program to be played by the client device only when that media program is currently airing in a locale of the client device and wherein the media program will become unavailable for viewing after a predefined amount of time has elapsed after the currently airing media program ends, and wherein the currently airing restriction causes an indicator to be displayed by the client device during playback of the media program that indicates a remaining amount of time until playback of the media program will no longer be allowed; and
   responsive to the determining that the currently airing restriction is configured as one of the set of restrictions, performing the following:
      determining whether at a time of the first request the media program is currently airing in the locale of the client device; and
      transmitting the media program to the client device for playback only responsive to a determination that at the time of the first request the media program is currently airing in the locale of the client device and only when the predefined amount of time has not elapsed.

2. The method of claim 1, wherein the media program is one of a first set of one or more media programs of a same channel that have been enabled for network media program restart, and wherein there is a second set of one or more media programs of the same channel that are not enabled for network media program restart.

3. The method of claim 1, further comprising:
   recording the media program based on the set of restrictions to a data store; and
   prior to transmitting the media program to the client device, retrieving the media program from the data store.

4. The method of claim 1, further comprising:
   receiving a second request from the client device to play the media program at a different speed;
   determining whether the set of restrictions for the media program allow playback of the media program at the different speed; and
   responsive to a determination that playback of the media program at the different speed is allowed, transmitting the media program at the different speed to the client device.

5. The method of claim 1, further comprising:
   receiving a second request from the client device to play the media program at a different speed;
   determining whether the set of restrictions for the media program allow playback of the media program at the different speed; and
   responsive to a determination that playback of the media program at the different speed is not allowed, transmitting a message to the client device that indicates that playback at the different speed is not allowed.

6. The method of claim 1, further comprising:
   receiving a second request from the client device to pause the media program;
   determining whether the set of restrictions for the media program allow playback of the media program to be paused; and
   responsive to a determination that playback of the media program is allowed to be paused, stopping the transmission of the media program until receiving a third request from the client device to resume playback of the media program.

7. The method of claim 1, further comprising:
   determining a time of expiration for the media program; and
   responsive to the time of expiration for the media program being met, stopping the transmission of the media program to the client device for playback.

8. A method in a client device for network media program restart, comprising:
   receiving a message that indicates that network media program restart is enabled for a set of one or more media programs of a media channel;
   for each of the set of media programs, causing a first indicator to be displayed that indicates that the media program is allowed to be restarted regardless of whether the media program is included in a local buffer of the client device;
   upon receiving input to restart a first one of the set of media programs, transmitting a first request to a server for the first media program;
   receiving, from the server, a stream for the first media program, wherein the stream is associated with a set of one or more restrictions including a restriction that playing of the stream will not be allowed after a predefined amount of time has elapsed after the first media program has finished airing in a locale of the client device;
   playing the stream; and
   causing a second indicator to be displayed during playing of the stream that indicates a remaining amount of time until playing of the stream will no longer be allowed.

9. The method of claim 8, wherein the predefined amount of time does not exceed a duration of the first media program.

10. The method of claim 8, further comprising:
    wherein the set of one or more restrictions further include a restriction that does not allow playback of the first media program of a different speed;
    responsive to receiving input to play the first media program at the different speed,
       transmitting a second request to the server to play the first media program at the different speed,
       receiving from the server a response to the second request that indicates that playback at the different speed is not allowed, and causing a third indicator to be displayed during playing of the stream that indicates that playback of the first media program at the different speed is not allowed.

11. The method of claim 8, further comprising:
responsive to receiving input to pause playing of the stream, causing a third indicator to be displayed that indicates that the first media program may not be able to be watched in full if the stream is not restarted.

12. The method of claim 8, wherein the first indicator is to be displayed in an electronic media program guide (EPG), a channel bar, a browse bar, or a media program information page.

13. An apparatus for network media program restart, comprising:
a processor; and
a non-transitory machine-readable storage medium containing instructions executable by said processor whereby said apparatus is operative to:
receive a first request from a client device to play a media program from a beginning of the media program, wherein the media program has been configured as being enabled for network media program restart subject to a set of one or more restrictions;
determine the set of restrictions for the media program;
determine that a currently airing restriction is configured as one of the set of restrictions that allows the media program to be played by the client device only when that media program is currently airing in a locale of the client device and wherein the media program will become unavailable for viewing after a predefined amount of time has elapsed after the currently airing media program ends, and wherein the currently airing restriction causes an indicator to be displayed by the client device during playback of the media program that indicates a remaining amount of time until playback of the media program will no longer be allowed; and
responsive to the determination that the currently airing restriction is configured as one of the set of restrictions, perform the following:
determine whether at a time of the first request the media program is currently airing in the locale of the client device; and
transmit the media program to the client device for playback only responsive to a determination that at the time of the first request the media program is currently airing in the locale of the client device and only when the predefined amount of time has not elapsed.

14. The apparatus of claim 13, wherein the media program is one of a first set of one or more media programs of a same channel that have been enabled for network media program restart, and wherein there is a second set of one or more media programs of the same channel that are not enabled for network media program restart.

15. The apparatus of claim 13, wherein the non-transitory machine-readable storage medium further contains instructions executable by said processor whereby said apparatus is operative to:
record the media program based on the set of restrictions to a data store; and
prior to transmission of the media program to the client device, retrieve the media program from the data store.

16. The apparatus of claim 13, wherein the non-transitory machine-readable storage medium further contains instructions executable by said processor whereby said apparatus is operative to:
receive a second request from the client device to play the media program at a different speed;
determine whether the set of restrictions for the media program allow playback of the media program at the different speed; and
responsive to a determination that playback of the media program at the different speed is allowed, transmit the media program at the different speed to the client device.

17. The apparatus of claim 13, wherein the non-transitory machine-readable storage medium further contains instructions executable by said processor whereby said apparatus is operative to:
receive a second request from the client device to play the media program at a different speed;
determine whether the set of restrictions for the media program allow playback of the media program at the different speed; and
responsive to a determination that playback of the media program at the different speed is not allowed, transmit a message to the client device that indicates that playback at the different speed is not allowed.

18. The apparatus of claim 13, wherein the non-transitory machine-readable storage medium further contains instructions executable by said processor whereby said apparatus is operative to:
receive a second request from the client device to pause the media program;
determine whether the set of restrictions for the media program allow playback of the media program to be paused; and
responsive to a determination that playback of the media program is allowed to be paused, stop the transmission of the media program until receipt of a third request from the client device to resume playback of the media program.

19. The apparatus of claim 13, wherein the non-transitory machine-readable storage medium further contains instructions executable by said processor whereby said apparatus is operative to:
determine a time of expiration for the media program; and
responsive to the time of expiration for the media program being met, stop the transmission of the media program to the client device for playback.

20. An apparatus for network media program restart, comprising:
a processor; and
a non-transitory machine-readable storage medium containing instructions executable by said processor whereby said apparatus is operative to:
receive a message that indicates that network media program restart is enabled for a set of one or more media programs of a media channel;
for each of the set of media programs, cause a first indicator to be displayed that indicates that the media program is allowed to be restarted regardless of whether the media program is included in a local buffer of a client device;
upon receipt of input to restart a first one of the set of media programs, transmit a first request to a server for the first media program;
receive, from the server, a stream for the first media program, wherein the stream is associated with a set of one or more restrictions including a restriction that playing of the stream will not be allowed after a predefined amount of time has elapsed after the first media program has finished airing in a locale of the client device;

play the stream; and cause a second indicator to be displayed during playing of the stream that indicates a remaining amount of time until playing of the stream will no longer be allowed.

21. The apparatus of claim 20, wherein the predefined amount of time does not exceed a duration of the first media program.

22. The apparatus of claim 20, wherein the non-transitory machine-readable storage medium further contains instructions executable by said processor whereby said apparatus is operative to:

wherein the set of one or more restrictions further include a restriction that does not allow playback of the first media program of a different speed;

responsive to receipt of input to play the first media program at the different speed, transmit a second request to the server to play the first media program at the different speed, receive from the server a response to the second request that indicates that playback at the different speed is not allowed, and cause a third indicator to be displayed during playing of the stream that indicates that playback of the first media program at the different speed is not allowed.

23. The apparatus of claim 20, wherein the non-transitory machine-readable storage medium further contains instructions executable by said processor whereby said apparatus is operative to:

responsive to receipt of input to pause playing of the stream, cause a third indicator to be displayed that indicates that the first media program may not be able to be watched in full if the stream is not restarted.

24. The apparatus of claim 20, wherein the first indicator is to be displayed in an electronic media program guide (EPG), a channel bar, a browse bar, or a media program information page.

* * * * *